March 10, 1970 H. R. ERHARDT ET AL 3,500,410

APPARATUS FOR ROTATING AN ANTENNA FIELD PATTERN

Filed May 22, 1962 16 Sheets-Sheet 1

INVENTORS.
HAROLD R. ERHARDT,
FREDERICK W. FRINK,
GORDON GERSON,
DONALD C. MEAD,
HAROLD J. PFIFFNER,
BY
Noel B. Hammond
AGENT

APPARATUS FOR ROTATING AN ANTENNA FIELD PATTERN

Filed May 22, 1962 16 Sheets-Sheet 2

March 10, 1970 H. R. ERHARDT ET AL 3,500,410

APPARATUS FOR ROTATING AN ANTENNA FIELD PATTERN

Filed May 22, 1962 16 Sheets-Sheet 4

APPARATUS FOR ROTATING AN ANTENNA FIELD PATTERN

Filed May 22, 1962 16 Sheets-Sheet 5

March 10, 1970 H. R. ERHARDT ET AL 3,500,410

APPARATUS FOR ROTATING AN ANTENNA FIELD PATTERN

Filed May 22, 1962 16 Sheets-Sheet 6

APPARATUS FOR ROTATING AN ANTENNA FIELD PATTERN

March 10, 1970 H. R. ERHARDT ET AL 3,500,410

APPARATUS FOR ROTATING AN ANTENNA FIELD PATTERN

Filed May 22, 1962 16 Sheets-Sheet 9

APPARATUS FOR ROTATING AN ANTENNA FIELD PATTERN

| SWITCH | IN | OUT | IN | OUT |
|---|---|---|---|---|
| A1-A7 | LOW | +9V. | HIGH | GND. |
| B | LOW | +9V. | HIGH | GND. |
| C | LOW | -9V. | HIGH | GND. |

March 10, 1970 H. R. ERHARDT ET AL 3,500,410

APPARATUS FOR ROTATING AN ANTENNA FIELD PATTERN

Filed May 22, 1962 16 Sheets-Sheet 12

APPARATUS FOR ROTATING AN ANTENNA FIELD PATTERN 3,500,410

APPARATUS FOR ROTATING AN ANTENNA FIELD PATTERN

Harold R. Erhardt, Northridge, Frederick W. Frink and Gordon Gerson, Los Angeles, Donald C. Mead, Playa Del Rey, and Harold J. Pfiffner, Los Angeles, Calif., assignors to Hughes Aircraft Company, Culver City, Calif., a corporation of Delaware Filed May 22, 1962, Ser. No. 196,655
Int. Cl. H01q 3/26
U.S. Cl. 343—100 4 Claims This invention relates to directive radio antenna systems and, more particularly, to apparatus for producing a rotating directive antenna field pattern.

Rotating antenna field patterns have been utilized in radio beacons and direction finding equipment for a number of years. A more recent application for rotating antenna patterns is in space vehicles such as communication satellites, for example. To eliminate the necessity for complex or cumbersome automatic orientation systems in a communication satellite orbiting the earth, the satellite may be caused to spin about an axis as it traverses its orbit to provide orientation stability, with the spin axis perpendicular to a line from the earth to the satellite. A directive antenna may then be used to provide a pencil-like beam or lobe of narrow width that is directed to the earth. Such an antenna provides a gain improvement of approximately 18 decibels.

To provide a pencil-like directive antenna field pattern in a fixed direction from a spinning body, the antenna pattern must rotate counter to the spin of the body and at the same angular rate.

The apparatus utilized for producing rotating antenna field patterns for radio beacons or direction finding equipment is unsuitable for use in space vehicles. The antenna field patterns produced thereby are usually not of the highly directive, pencil-beam type. The apparatus is large and heavy, usually utilizing large rotating structures such as apertured masks or cages, large rotating antenna elements or the like. This prior art apparatus is not adapted for use on a spinning body, there being no provisions for counter rotation of the field pattern at the same angular rate thereof.

One type of electronic antenna pattern rotating system utilizes four solar cells symmetrically disposed around the periphery of a satellite to develop pulses as the satellite spins. The pulses are formed into phase-displaced sine wave control voltages for application to controllable phase shifters associated with four antenna elements. Clockwork mechanisms progressively shift the phase of the control voltages to correct for the apparent motion of the sun around the earth.

Although this prior art system is satisfactory as a simple form of apparatus for rotating a directive antenna pattern, it possesses certain disadvantages. The use of a small number of antenna elements does not provide the optimum amount of antenna directivity that may be achieved. If an attempt is made to utilize a large number of elements in prior art systems the relative phasing of the various control voltages becomes more difficult to adjust. The separate phase shifters for each antenna element require an excessive control current and a complex power splitting arrangement. Further disadvantages of this prior art system are that no provision is made for adjusting the direction of the antenna beam in small increments and that no provisions are made for adjusting the direction of the antenna beam by remote control either to initially direct the beam or to correct for minor errors in direction over a period of time. Furthermore, the use of a mechanical clockwork mechanism to correct for relative motion between the sun and the earth may lead to reliability problems as such as delicate mechanism may not survive the placing of the satellite in orbit.

Accordingly, it is an object of the invention to provide a control system for a phased antenna array having a large number of antenna elements to produce a rotating directive antenna field pattern.

Another object of the invention is the provision of a control system for a directive antenna array that utilizes digital circuits for the generation of sinusoidal waves at low frequency and variable over a wide range of frequencies.

Yet another object of the present invention is to provide apparatus for controlling a phased antenna array in which corrections in the direction of the antenna field pattern may be made in fine increments either automatically or by remote control.

In accordance with these and other objects of the invention a multi-element antenna array is provided, the relative disposition and excitation phase of the various elements thereof being such that a narrow beam type of field pattern is formed. The excitation phase is periodically modulated or varied by electrically controlled phase shifters to cause the beam to rotate. The rotation of the antenna field pattern is controlled by a single pulse source which may be a single solar cell on a space vehicle such as a rotating communication satellite. In this manner, the antenna field pattern may be maintained pointing in a desired direction.

The following specification and the accompanying drawings describe and illustrate an exemplification of the present invention. Consideration of the specification and the drawings will provide complete understanding of the invention, including the novel features and objects thereof. Like reference characters are used to designate like parts throughout the figures of the drawings.

Figure 8:
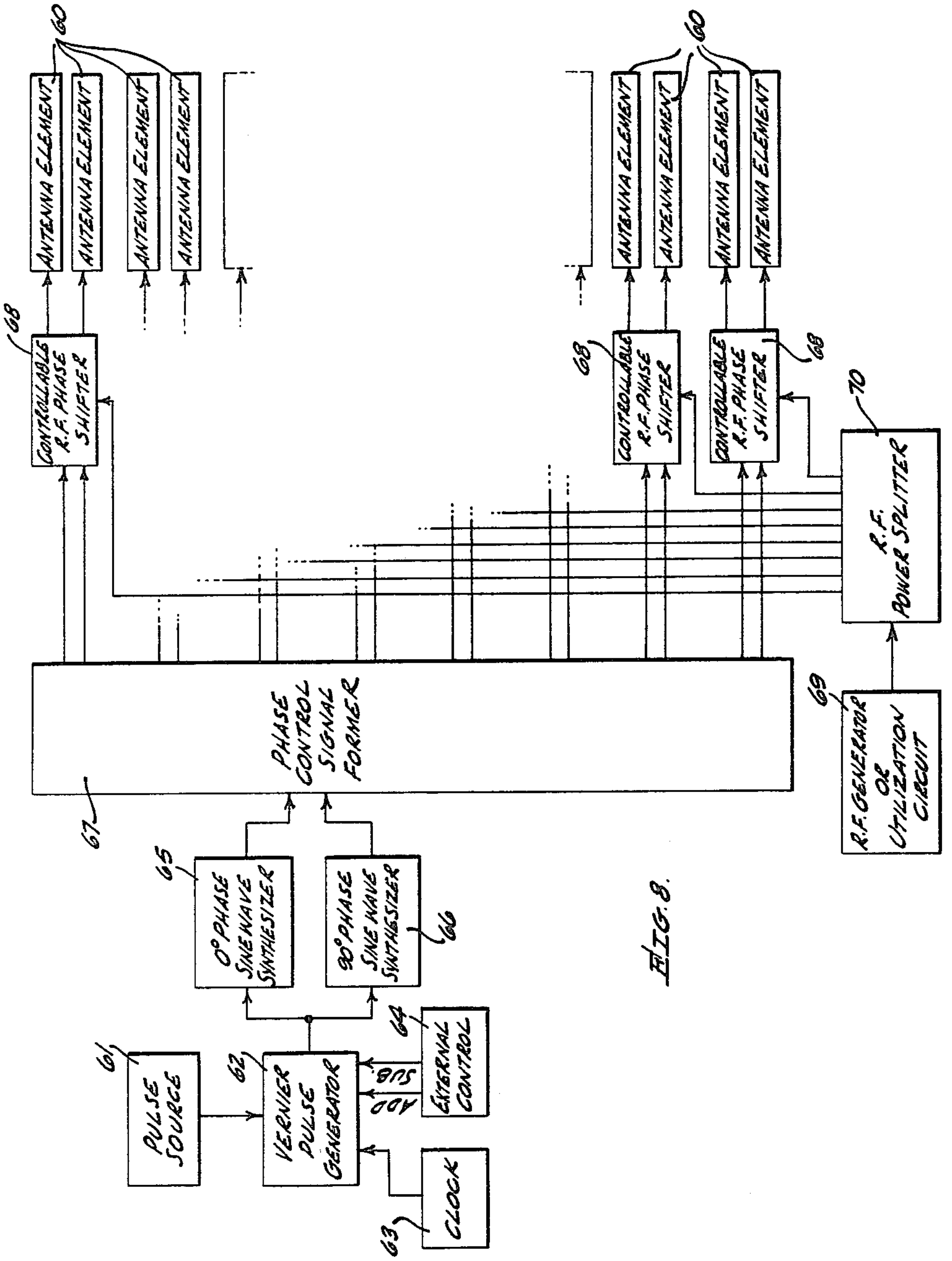
FIG. 8 is an over-all block diagram of an embodiment of a control circuit constructed in accordance with the present invention for controlling the phasing of the elements of the antenna array of FIGS. 2, 3 and 4.
Figure 32:
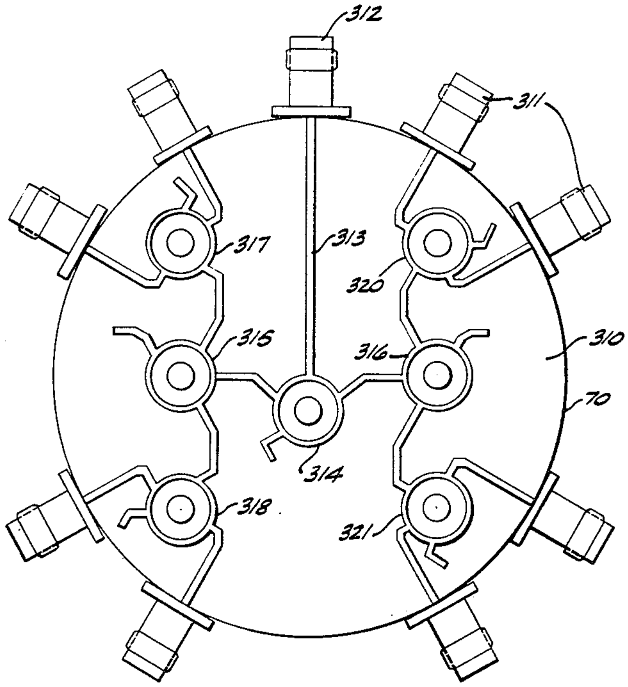

FIGS. 30, 31, 33, 34, 35, and 36 are views of a controllable RF phase shifter of the antenna phasing control circuit of FIG. 8; and FIG. 32 is a plan view of the inerior of power splitter utilized in the antenna phasing control circuit of FIG. 8.

Figures 1, 2, 3, 4:
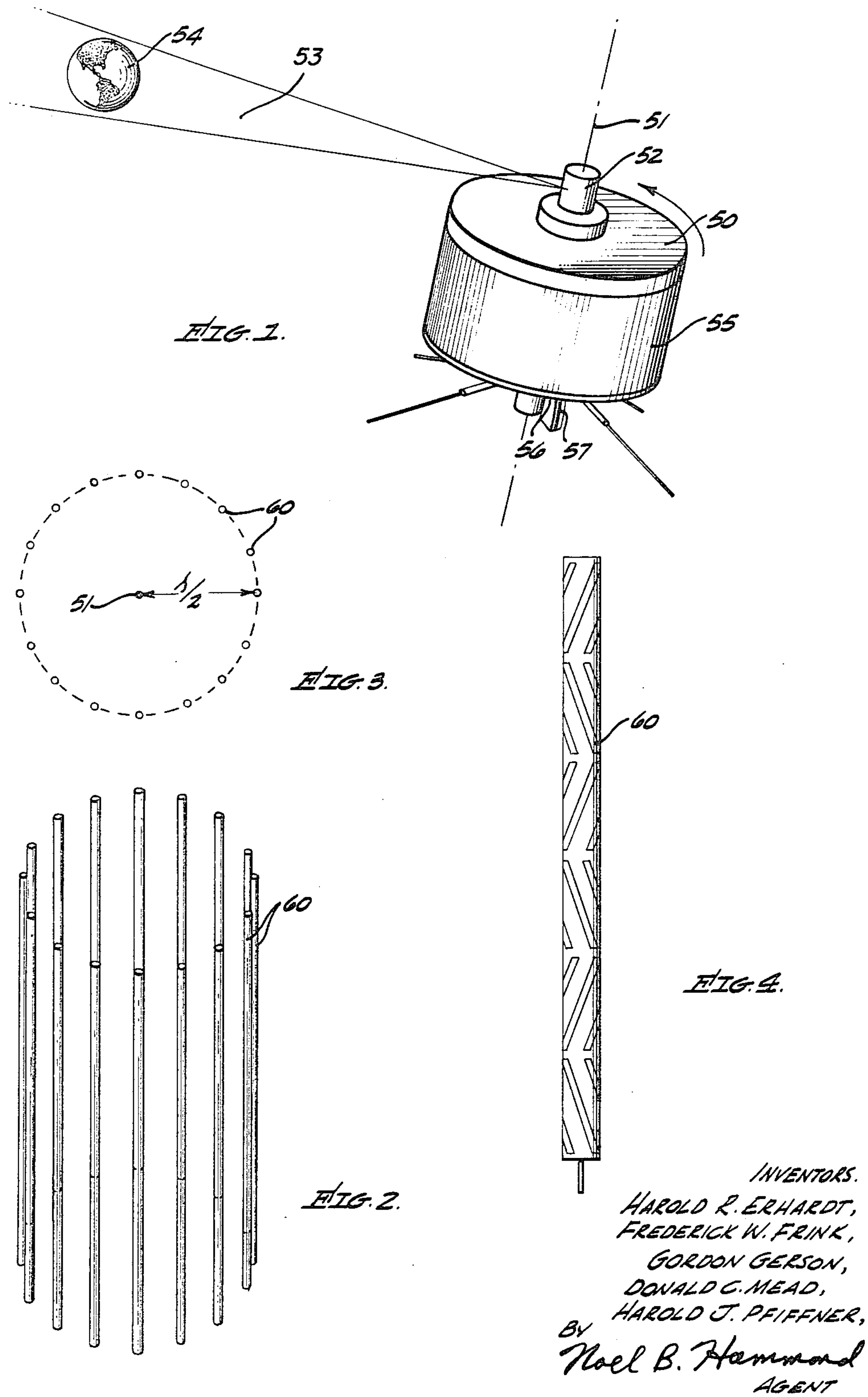
FIG. 1 is a perspective view of the earth and an orbiting satellite associated therewith and illustrating a directive antenna field pattern of the type contemplated by this invention.
FIG. 2 illustrates in perspective a multi-element antenna array utilized on the space vehicle of FIG. 1.
FIG. 3 is a plan view of the antenna array of FIG. 2 indicating the spacing and arrangement of the antenna elements.
FIG. 4 is a detailed view of a single element of the antenna array of FIGS. 2 and 3.

Referring now to FIG. 1 of the drawings, there is illustrated a space vehicle, such as a communications satellite 50 with which the present invention may be practiced. It will be understood that the present invention may be used to rotate an antenna field pattern on fixed objects located on the earth as well as in space vehicles such as the satellite 50. The satellite 50 is illustrated as a cylindrical device having a spin axis 51 about which the satellite rotates to provide spin stabilization in orbit. The spin of the satellite 50 may be impared by the launching rockets which also spin for stabilization in flight. The spin rate is usually on the order of two revolutions per second. An antenna housing 52 at one end of one of the flat surfaces of the satellite 50 and concentric with the spin axis 51 has emanating from it a conical beam or antenna field pattern 53 of radio energy which illuminates the earth 54. The satellite 50 of the present example is a synchronous communication satellite of the type which hovers over a single geographic area of the earth 54 by rotating with the earth 54 at the same angular velocity. Such an orbit is commonly referred to as being of the synchronous, stationary or twenty-four hour type. Although described with reference to a stationary orbit, the principle of this invention is also applicable to satellites in other orbits. The spin axis 51 is parallel to the rotational axis of the earth

54 and the satellite 50 is in the equatorial plane of the earth 54. For other than equatorial orbtis, the spin axis is aligned normal to the orbital plane. Methods of placing the satellite 50 into its orbit are known and form no part of the present invention. The included angle of the antenna field pattern 53 is shown in FIG. 1. The angle is approximately 17.3 degrees. FIG. 1 is solely representative and is not to scale, the relative size of the satellite 50 and that of the earth 54 and the distances therebetween being disproportionate for convenience. The satellite 50 is at an altitude of approximately 22,300 miles above the earth 54 and, at this distance, the provision of an extremely directive antenna field pattern 53 is of great importance. The gain of the antenna pattern 53 when it just encompasses the earth 54 from an altitude of 22,300 miles is approximately 18 decibles. Although the satellite 50 may be provided with a plurality of solar cells 55, for the purpose of generating energy for use by circuits within the satellite 50, there is a single solar cell utilized for phase reference indicating the relative direction of the satellite 50 to the sun. This phase reference solar cell is disposed in a housing 56 located on the opposite flat side of the satellite 50 from the antenna housing 52. The solar cell housing 56 is provided with a slit 57 having a fan-shaped field of view through which sunligt enters once for each revolution of the satellite around its spin axis 51. The solar sensor housing 56 is a generally elongated flat assembly that is aligned with and intersected by a plane passing through the spin axis 51. The solar sensing element located within the housing 56 may be cadmium sulfide or silicon cells that produce an electrical voltage in response to sunlight entering the slit 57. The pulse generated by the phase reference solar cell is used to provide a reference signal that permits the antenna pattern 53 to be constantly directed toward the earth 54.

Referring now to FIG. 2, an array of antenna elements 60 is illustrated and in the present example consists of sixteen elements 60 which are symmetrically arranged around the spin axis and displaced from it by approximately one wavelength, as indicated in FIG. 3, which is, in the present example, approximately three inches. Each of the antenna elements 60 is approximately nine inches long. FIG. 4 is a detailed view of a single one of the elements 60 and illustrates that it is a slotted coaxial radiator of a type that is more or less conventional. Each of the antenna elements 60 are longitudinal, rod-like members and project parallel to the spin axis 51. In the present example, the antenna is designed for operation in the vicinity of 2000 megacycles. Any number from a minimum of two elements 60 may be utilized. The gain improvement is, in general, proportional to the number of elements 60. However, if a greater number of elements 60 are symmetrically located at the same radial distance from the spin axis 51 as provided for the lesser number of elements 60, the spacing between the elements 60 will be less and there will be an increase of interaction or mutual coupling between them that will adversely affect the radiation impedance to some extent so that the optimum gain improvement factor may not be achieved.

Figure 5:
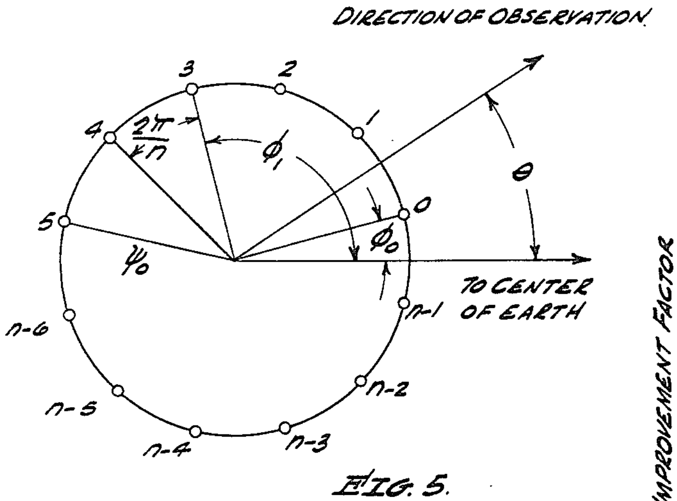
FIG. 5 is a schematic representation of the antenna array of FIGS. 2 and 3 illustrating the meaning of the symbols used in analysis of the operation of the antenna array.

The number 16 for the quantity of elements 60 to be used in the present antenna array was arrived at by analysis, as follows: For all configurations, the elements 60 were assumed to be excited with signals of equal power but phased so that their fields are reinforced in the direction of the center of the earth. The radiation is polarized perpendicular to the elements 60 in order to minimize the reflection loss. Referring to FIG. 5 for the symbols utilized in the following analysis, if the electrical radius of the array is $\psi_o$ radians, the excitation required for element $i$ is $$\psi_i = -\psi_o \cos \phi_i$$

where $$\phi_i = \phi_o + \frac{2\pi i}{n}$$

For this phase excitation program, the normalized field pattern around the spin axis is given by $$E=\frac{2}{n}\sum_{i=0}^{\frac{n}{2}-1}\cos\left(\psi_o[\cos(\phi_i-\theta)-\cos\phi_i]\right)$$

Figure 6:
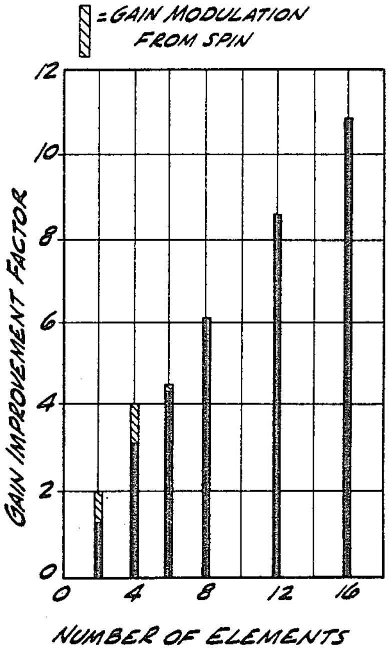
FIG. 6 is a bar chart illustrating the gain improvement obtained by this antenna array as a function of the number of antenna elements.
Figure 7:
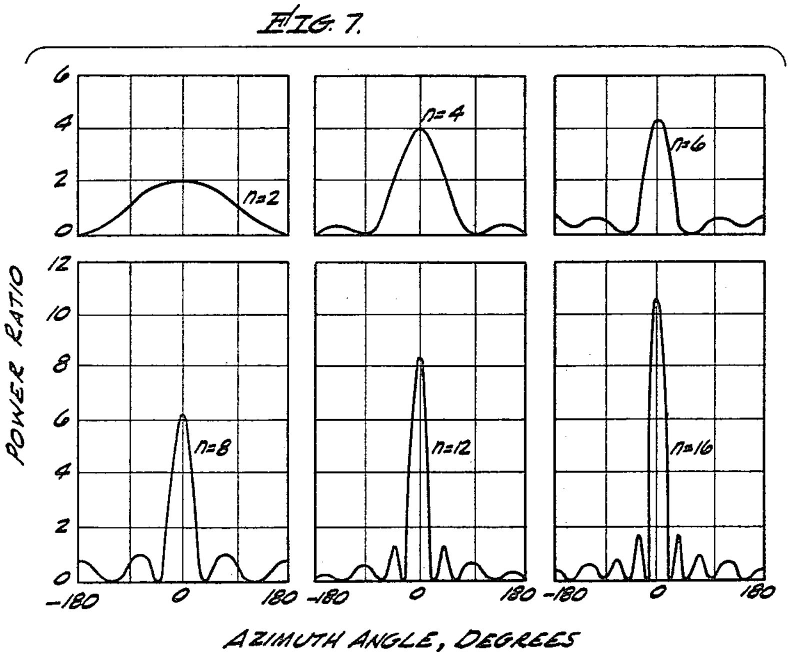
FIG. 7 is a diagram indicating the antenna pattern obtained as a function of different numbers of elements.

As the number of elements 60 is increased the electrical radius may be increased for a given amount of incidental gain modulation due to spin. The gain then increases linearly with the number of elements for small numbers of elements and somewhat more slowly for large numbers. It was found that the best patterns and minimum gain modulation were obtained with an electrical radius of $n\pi/8$ radians. The gain and gain modulation for arrays having this radius are shown in FIG. 6. The gain modulation is quite small for the higher number arrays, as may be seen in FIG. 6, and is actually less than .01 decibel for the 16-element array. The power patterns for these arrays are shown in FIG. 7. This pattern gain must be multiplied by the pattern gain in the plane of the spin axis to give the total gain.

Figure 9:
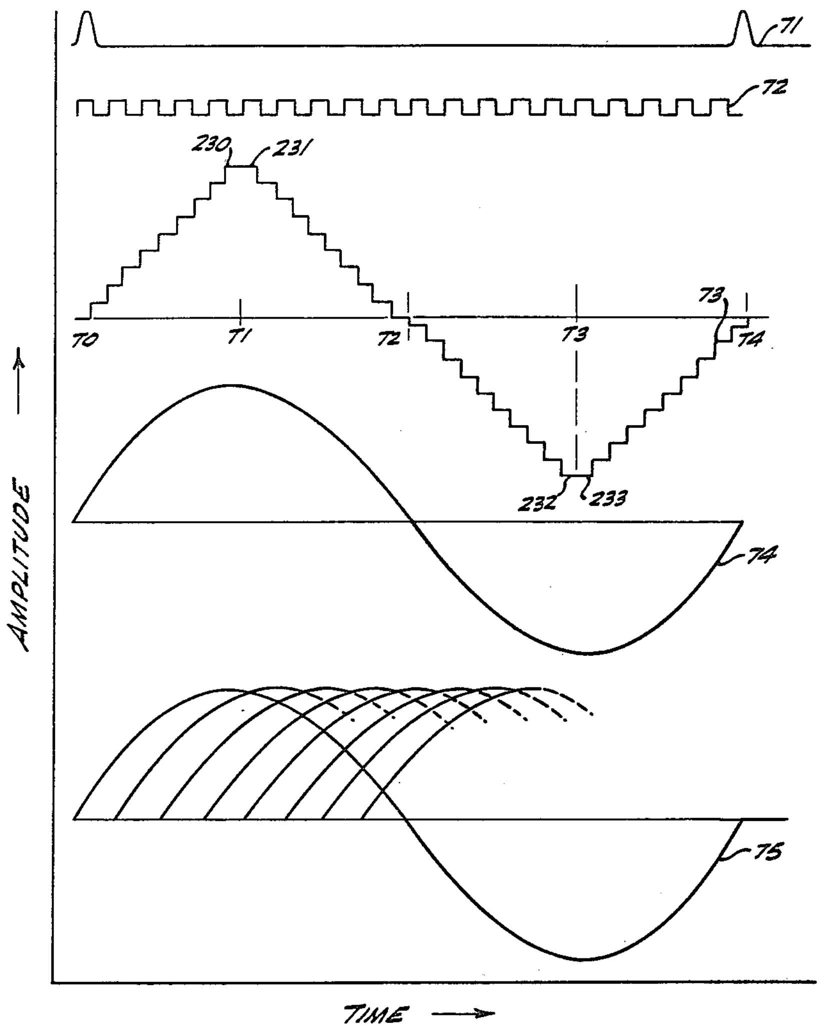
FIG. 9 is a diagram of waveforms occurring in the control circuit of FIG. 8.

Referring now to FIG. 8, there is illustrated a block diagram of an embodiment of an antenna phasing control circuit constructed in accordance with the present invention for providing the antenna phasing necessary to produce the indicated performance from the 16-element array of FIG. 2. Prior to explaining in detail the nature of the circuits involved, the antenna phasing control circuit of FIG. 8 will be described briefly in a general manner. Referring now to FIG. 8 taken in conjunction with the waveform diagrams of FIGS. 9, 10 and 11, the pulse source 61 is a source of reference pulses and may, in the present example, correspond to the solar sensor in the housing 56 of the satellite 50 shown in FIG. 1. The pulse source 61 provides one pulse for each rotation cycle of the satellite. As indicated previously, the rotation frequency may be on the order of two revolutions per second. Hence, pulse source 61 will provide pulses at approximately two pulses per second. These pulses are indicated in FIG. 9 by the waveform 71. A vernier pulse generator 62 provides a plurality of pulses for each reference pulse from the pulse source 61. In the present example, 512 pulses are developed by the vernier pulse generator 62 for each pulse of the pulse source 61. The 512 pulses from the pulse source 62 correspond to the increments in which the direction of pointing of the antenna beam can be corrected. The pulses from the pulse source 61 synchronize control of the vernier pulses and the vernier pulse generator 62. The vernier pulses are indicated in FIG. 9 by waveform 72. For convenience, a lesser number than 512 pulses is illustrated in FIG. 9. A clock 63 provides extra pulses to the vernier pulse generator 62 to take into account the relative rotation of the sun with respect to the satellite 50. The reference pulses from the pulse source 61 are to indicate the direction of pointing of the antenna beam with respect to the earth. But the reference pulses developed by the pulse source 61 are derived from the position of the sun with respect to the satellite. Because the satellite 50 rotates with the earth 54, there would be a gradual change in direction of the antenna beam away from the earth 54 as the earth and satellite rotate with respect to the sun. Accordingly, the clock 63 inserts 512 additional pulses per day at regular intervals to compensate for the motion of the earth and the satellite with respect to the sun. The clock 63 may therefore be a mechanical clockwork mechanism which develops one pulse every 2.81 minutes, or as in the present example, a stable pulse generator providing one additional pulse every 2.81 minutes. An external control 64 provides for correcting the vernier pulse train developed by the vernier pulse generator 62 from a remote location. In this manner, the original setting of the direction of the antenna beam may be accomplished from the earth by adding or subtracting a number of pulses. This is done only once for a given correction. Thereafter, exactly 512 vernier pulses occur between the solar sensor pulses as previously described. In addition, minor errors, which develop in the pointing direction of the antenna beam may be corrected over long periods of time in the same manner. The external control 64 is, in the present example, a radio transmitter and receiver by means of which pulses may be transmitted from the earth. Such radio control circuits are well known and no further description will be made of the external control 64 herein. The vernier pulses from the vernier pulse generator 62 are coupled to the respective inputs of a zero degree phase sine wave synthesizer 65, and a ninety degree sine wave synthesizer 66. As will be described later, each synthesizer 65 and 66 includes a suitable counter driven converter producing a triangular waveform which is then shaped to closely approximate a sine wave. FIG. 9 depicts the waveforms of the zero degree phase sine wave synthesizer 65. The ninety degree sine wave synthesizer 66 produces a similar set of waveforms displaced 90° from those of synthesizer 65. Accordingly, two sine waves 90° out of phase are applied to the phase control signal former 67. The sine waves have the period of the rotation frequency of the satellite or the same frequency as the pulses from the pulse source 61, that is to say in the present example, the sine waves are applied to the phase control signal former 67 is approximately two cycles per second. It will be understood, however, that there will be a slow variation in phase of the sine waves with respect to the solar sensor pulses 71 applied to the signal former 67 as pulses are inserted into the vernier pulse generator 62 by the clock 63.

Figure 10:
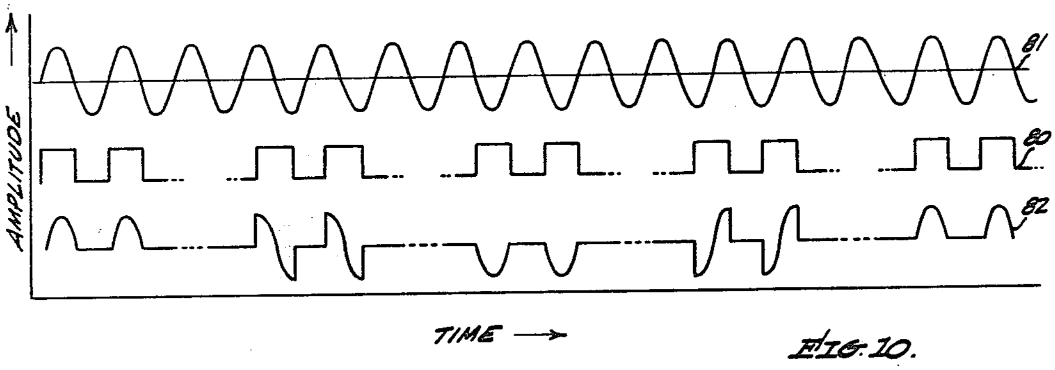
FIG. 10 is also a diagram of waveforms occurring in the control circuit of FIG. 8.
Figure 11:
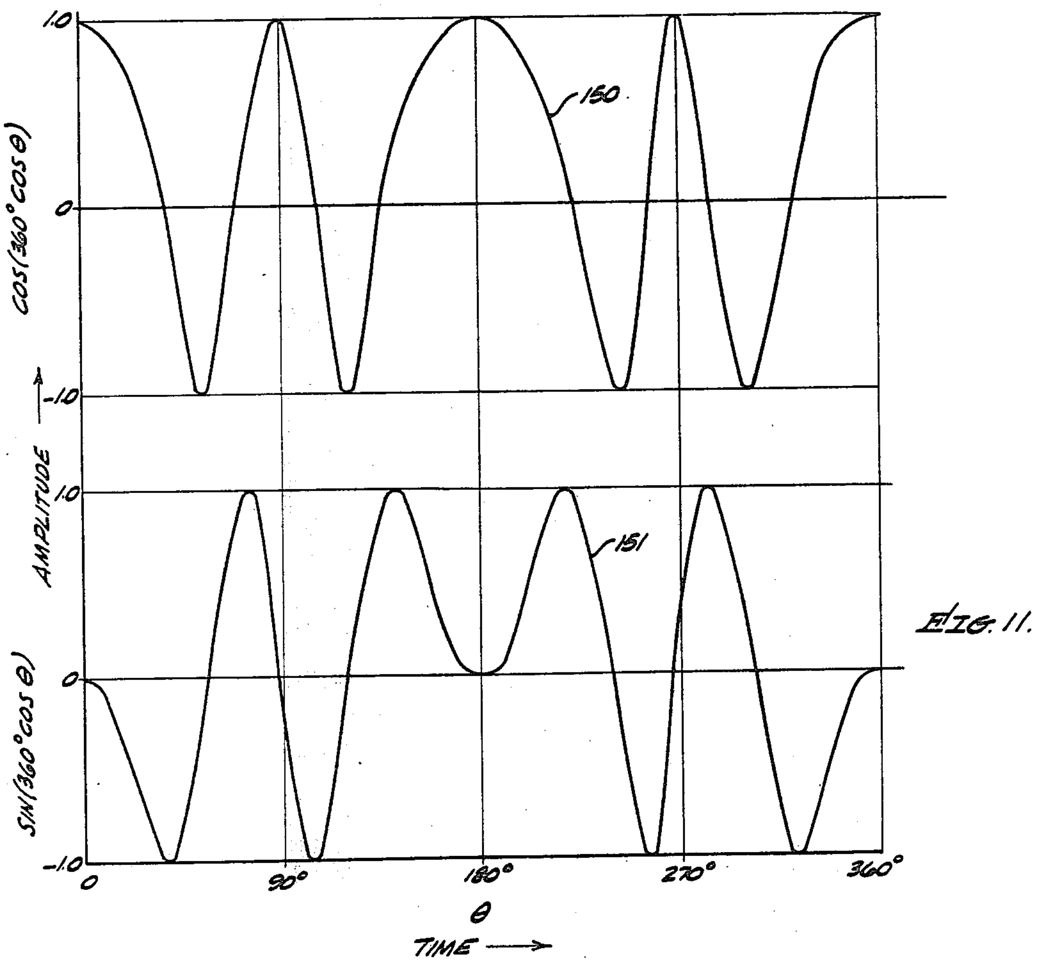
FIG. 11 is a diagram of the waveforms of the control voltages applied to the antenna phase shifters in the control circuit of FIG. 8.

The phase control signal former 67 generates phase control voltages which are applied to eight controllable RF phase shifters 68. The proper phase control waveforms are developed by first combining the 0° and 90° sine waves to produce eight sine waves each being displaced from the other by 22.5°, as indicated by the waveform 75 in FIG. 9. These sine waves are then used to phase modulate the timing of 10,000 cycle per second pulses produced by multivibrator 130 (see FIG. 13). These 10,000 cycle per second phase modulated pulses are indicated by waveform 80 in FIG. 10. A 10,000 cycle per second reference sine wave indicated by waveform 81 is sampled by utilizing the phase modulated pulses 80 as gating pulses so that different portions of the 10,000 cycle sine wave, indicated by waveform 81, are sampled as indicated in waveform 82. These sampled portions are integrated to provide the control signal waveform at the output of the signal former 67. The control signal waveforms are indicated in FIG. 11. The controllable RF phase shifter 68 is of the type in which a rotating field is provided in a ferrite device by a two-phase, four-pole field coil. Consequently, two control signals in quadrature are applied to the phase shifter, as indicated in FIG. 11. The sampling of the positive half cycles of the reference sine wave 81 when integrated, corresponds to the most positive portions of the phase control voltages. The sampling at the cross-over point of the reference sine wave, when integrated, corresponds to the zero crossing portions of the phase control voltage and the sampling of the negative half cycles of the reference sine wave corresponds to most negative points in the phase control voltages. 16,666 such samples are required in order to provide the control voltage waveform indicated in FIG. 11. An RF generator or utilization circuit 69, which may be a radio transmitter or receiver, and in the present example is a radio transmitter, applies RF energy to an RF power splitter 70 which provides input radio frequency power to each of the controllable phase shifters 68 with equal amplitude and with equal phase. Each of the controllable phase shifters 68 has two outputs with equal amplitude and opposite phase which are supplied to two antenna elements 60 located on diametrically opposite sides of the anntenna array. Hence, due to the 22.5° phasing of the sine waves in the phase control signal former 67, the control signals applied to the controllable phase shifters 68 have the correct phase to produce a narrow pencil-like beam from the antenna array. As the sine waves applied to the phase control signal former 67 modulate the phase control voltages, the beam is caused to rotate at the rate of approximately two cycles per second, and the phase of the beam can be corrected in increments of $\frac{1}{512}$ of the distance around the circle of rotation.

Figure 12:
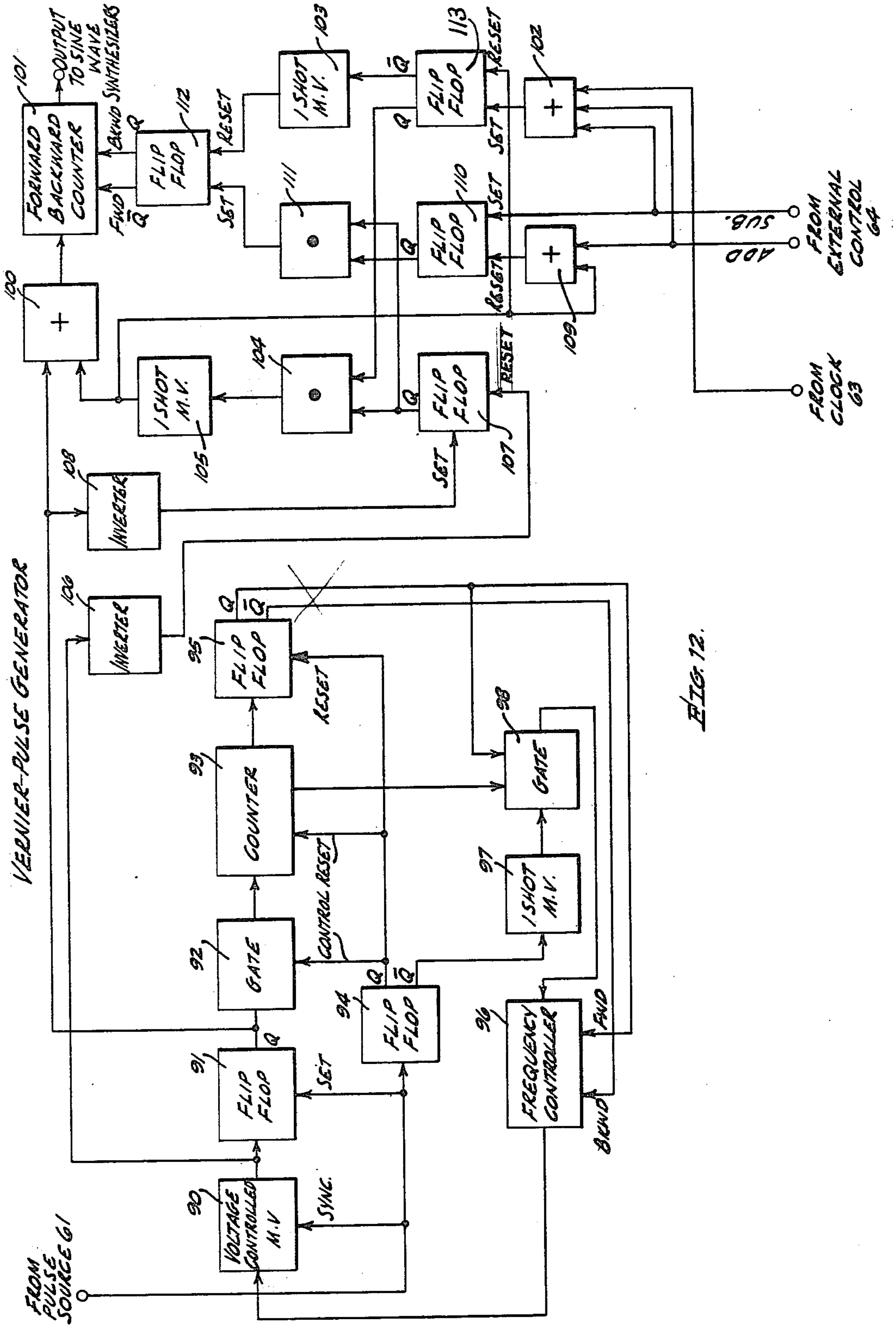
FIG. 12 is a block diagram of the vernier pulse generator of the control circuit of FIG. 8.

Referring now to FIG. 12, the vernier pulse generator 62 is provided with three separate portions. The first portion is a pulse generation and synchronization or control portion. The second portion is an output portion where the pulses are accumulated into a continuous stream and where additional pulses are added or subtracted to provide the proper output for the sine wave synthesizers 65 and 66. The third portion is the portion which adds in the additional pulses from the clock or from the external control. The vernier pulses are generated by a voltage-controlled multivibrator 90 which provides 1024 pulses for each pulse that arrives from the pulse source 61. The voltage-controlled multivibrator 90 will be described in more detail hereinafter but, in general, its frequency is varied by a control voltage that is applied through a sensing loop. Pulses from the pulse source 61 are applied to synchronize the multivibrator 90 so that at the time of arrival of a pulse from the pulse source 61, the output pulses from the multivibrator 90 begin in a particular direction. The pulse train from the voltage-controlled multivibrator 90 is a square wave and with each control pulse from the pulse source 61, the output is set into a high or positive state.

The output of the voltage controlled multivibrator 90 is applied to a flip flop 91 which divides the frequency of the pulse train by two. The flip flop 91 is a conventional binary device having a single input so that each pulse sets it into the opposite state to that in which it was. That is, the first pulse will set it from the high state to the low state and the second pulse will set it from the low state back to the high state; the third pulse switches it to the low state, etc. The ouput of the flip flop 91 is a train of 512 pulses for each control pulse from the pulse source 61. The control pulses from the pulse source 61 are also applied to the set input of the flip flop 91 so that the output of the flip flop 91 always begins on the first of 512 pulses in the high state. The output of the flip flop 91 is applied through a gate 92 to the input of a pulse counter 93. The gate is controlled by pulses from a second flip flop 94 which has an input from the pulse source 61. Hence, when the first pulse from the pulse source 61 arrives, flip flop 94 applies a signal to the gate 92 which opens the gate 92. When the next pulse arrives from the pulse source 61 the flip flop 94 closes the gate 92 and opens it again when the third pulse arrives from the pulse source 61. The counter 93, as will be more fully indicated hereinafter, is a nine-stage chain of flip flops arranged to count in a straight binary sequence up to a maximum count of 512. The output of the counter 93 is applied to a third flip flop 95 which determines whether the count was greater or less than 512 and thereby determines whether the voltage-controlled multivibrator 90 should have the frequency increased or decreased. Both the counter 93 and the third flip flop 95 are reset by the output of the second flip flop 94. The output of the third flip flop 95, both the signal output and the complement output, Q and $\overline{Q}$ respectively, are applied to the input of a frequency controller 96. That is, it is applied to two inputs labeled "Backward" and "Forward" which determine whether the frequency of the voltage-controlled multivibrator 90 is to be increased or decreased. The input signal for the frequency controller 96 is taken from the $\overline{Q}$ side of the flip flop 94 through a delay introduced by a one-shot multivibrator 97 whose output pulses are applied to a gate 98. The gate is controlled by the count in the pulse counter 93 and by the position of the flip flop 95. The $\overline{Q}$ side of the nine flip flops in the pulse counter 93 are connected to the gate as well as the Q side of flip flop 95 so that the gate is normally open except when a count of exactly 512 is registered in the counter 93 and flip flop 95. It will be understood that the gate circuit is merely an arrangement of diodes in a conventional manner. The output of the frequency controller 96, which circuit will be described in considerably more detail hereinafter, is an analog DC voltage which is applied to the control input of the voltage controlled multivibrator 90 to complete the phase and frequency lock loop.

The frequency control loop operates as follows: At the first pulse from the pulse source 61, flip flop 94 shifts into the position to reset counter 93 and flip flop 95, and to open gate 92 permitting a train of nominally 512 pulses to pass through the gate 92 into the counter 93. At the second pulse from the pulse source, gate 92 closes, permitting no more pulses to be entered into the counter 93 until the third pulse from the pulse source operates flip flop 94 to again open the gate. The counter 93 shifts in a binary manner to register each of the pulses received during a counting interval. If less than 512 pulses are received, say for example 511, then the flip flops in the pulse counter 93 will have registered the number 511, causing the gate 98 to be opened. The second pulse from the pulse source 61 applied to the flip flop 94 closes the gate 92 and applies a pulse to the one-shot multivibrator 97 which passes a pulse through the gate 98 to the frequency controller 96 which, because the add and subtract flip flop 95 is still in its reset state, converts the pulse applied at the frequency controller input into a voltage which will increase the frequency of the pulses from the voltage-controlled multivibrator 90. If the voltage-controlled multivibrator supplies too many pulses, say for example, 513 pulses, the following action takes place. The sun sensor pulse from pulse source 61 applied to the flip flop 94 results in the counter 93 being reset and the flip flop 95 being reset and gate 92 again being open; the 513 pulses are counted into the counter 93, the state of flip flop 95 is changed, causing gate 98 to be opened. When the following sun sensor pulse from the pulse source 61 is applied to flip flop 94, the gate 92 is caused to be closed and the one-shot multivibrator 97 is operated; finally the pulse from the one-shot multivibrator 97 passes through the gate 98, is applied to the frequency controller 96 while the signal from the flip flop 95 is on the backward control terminal. Accordingly, the frequency controller 96 applies a voltage to the voltage-controlled multivibrator 90 which causes its frequency to decrease. On the other hand, if exactly 512 pulses are produced between sun sensor pulses from pulse source 61, then counter 93 will have all of its flip flops in the reset or low position, flip flop 95 will be in the set or high position, and gate 98 will be closed when the next sun sensor pulse causes the initiation of a pulse from the one-shot multivibrator 97. Accordingly, no pulses will be applied to the frequency controller 96 and the control voltage applied to the voltage-controlled multivibrator 90 will remain the same.

The output pulses from the counting flip flop 91 are applied through an OR gate 100 to the counting input of forward-backward counter 101, which serves as the output register. The forward-backward counter 101 will be described in somewhat more detail hereinafter, but briefly may be identified as a nine-stage flip flop counter with a capacity of 512 counts, which counts the output pulses of OR gate 100, and which is controlled by signals applied to the forward-backward control inputs. This feature is used in connection with the external control 64 and the clock 63 to make adjustments in the direction of pointing of the antenna field pattern. Input pulses from the clock 63 are applied through an OR gate 102 to the set input of a flip flop 113 whose output passes through an AND gate 104 to trigger a one-shot multivibrator 105. The one-shot multivibrator applies the additional pulse from the clock 63 through the OR gate 100 to the input of the forward-backward counter 101. The function of the AND gate 104 is to insure that the pulse from the clock 63 is applied in between normal vernier pulses from the voltage controlled multivibrator 90 or more precisely, from the counting flip flop 91. Otherwise, if a pulse from the clock 63 were applied to the forward-backward counter 101 at the same time as a vernier pulse were applied thereto, there would be no additional count added by the clock pulse.

Accordingly, the output of the voltage-controlled multivibrator 90 is applied through an inverter 106 to the reset input of a flip flop 107. This flip flop 107 is always set back into its high condition by the vernier pulses applied through another inverter 108 to the set input of the flip flop 107. Accordingly, when the flip flop 107 is in the proper condition, the AND gate 104 is enabled and the pulse from flip flop 113 passes therethrough to trigger the one-shot multivibrator 105. The pulse from the one-shot multivibrator 105, in addition to being applied to the forward-backward counter 101 through the OR gate 100, also is applied to the reset input of the flip flop 113 and to the reset input of flip flop 110 through OR gate 109, both flip flops to be reset thereby indicating that the additional pulse from the clock 63 has been entered in the forward-backward counter 101. The add and subtract pulses from the external control 64 are entered in a similar manner. An add pulse to move the antenna beam in one direction—the forward direction—is applied through the OR gate 102 to the set input of flip flop 113 which applies an output through the AND gate 104, when the AND gate 104 is enabled to trigger the one-shot multivibrator 105. In addition, the add pulse is applied through an OR gate 109 to the reset input of flip flop 110 which prevents a pulse being coupled through an AND gate 111 to the set input terminal of a flip flop 112 which insures that the forward-backward counter 101 is in the add or count-forward position. The pulse from the one-shot multivibrator 105 which is entered into the forward-backward counter 101 and which resets flip flop 113 also resets flip flop 110.

When a subtract pulse is applied to the vernier pulse generator 62 from the external control 64 it causes flip flop 110 to be set, thereby applying a signal to AND gate 111. When AND gate 111 is enabled by flip flop 107 a pulse passes through to flip flop 112 which is set and causes counter 101 to be preset for counting in the backward direction. The subtract pulse coupled by the OR gate 102 to the set input of flip flop 113, causes this flip flop to change state applying a signal to the AND gate 104. When the AND gate 104 is enabled by flip flop 107 the one-shot multivibrator 105 is triggered. The one-shot multivibrator 105 applies a signal to the input of the forward backward counter 101 through the OR gate 100, the pulse being subtracted in the forward backward counter 101. The output of the one-short multivibrator 105 is also coupled by the OR gate 109 to flip flop 110 which is reset thereby and is also applied to the reset input of flip flop 113 which when reset provides a signal on the $\overline{Q}$ output to a one-shot multivibrator 103 which resets flip flop 112, thereby placing the forward backward counter 101 into the forward counting state in readiness for the next pulse from flip flop 91.

Figure 13:
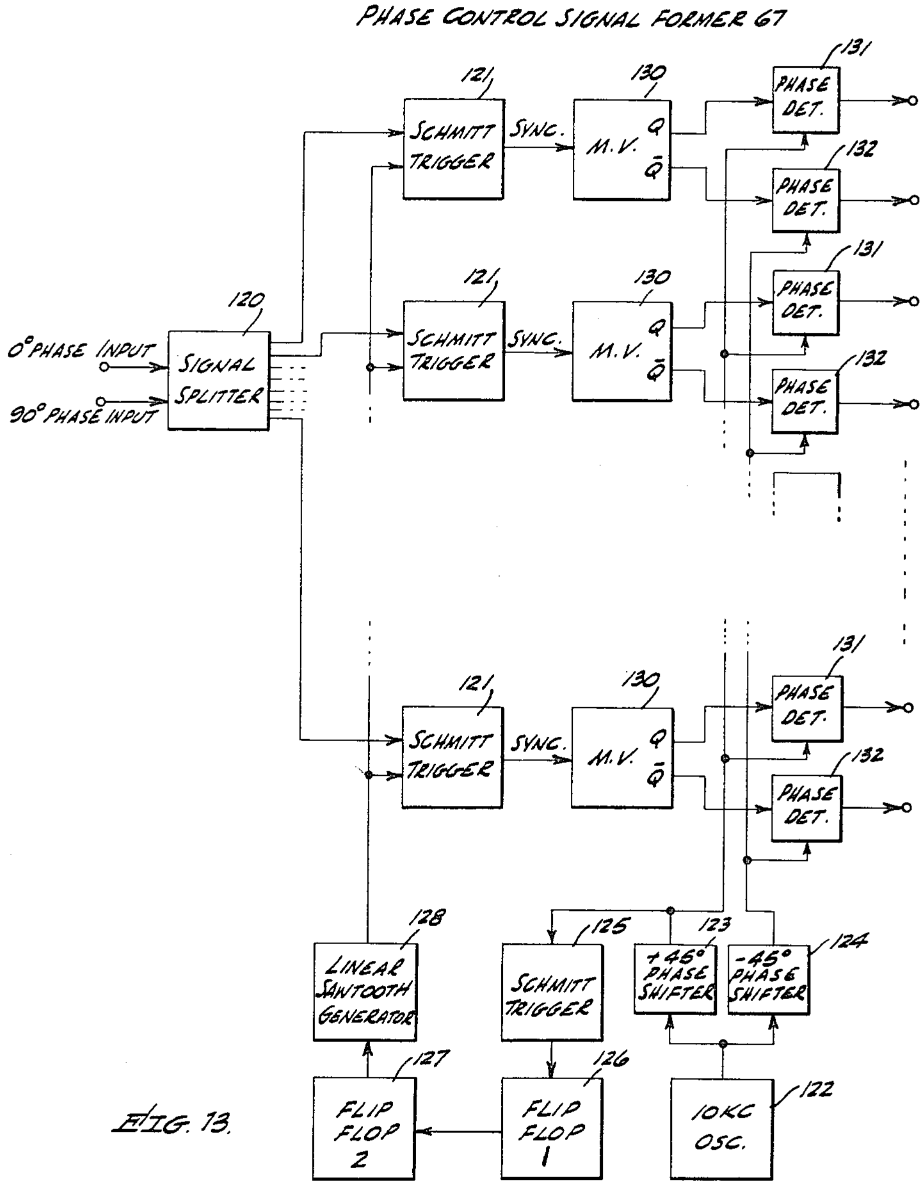
FIG. 13 is a block diagram of the phase control signal former of the antenna phasing control circuit of FIG. 8.

As stated hereinbefore, the trains of pulses from the forward backward counter 101 of the vernier pulse generator 62 are applied to the sine-wave synthesizers 65 and 66 where they are converted, utilizing digital to analogue conversion techniques which will be hereinafter described, into the two sine-waves in 90° phase relationship. Referring now to FIG. 13, the two sine-waves are applied to a signal splitter 120 at the input of the phase control signal former 67. In a manner which will be more fully described hereinafter, the signal splitter 120 combines the quadrature sine-waves in various proportions to obtain eight sine-wave outputs, each sine-wave being displaced by 22½°. Each of the sine-waves is applied to a different one of eight Schmitt trigger circuits 121 as a modulating input to provide pulse-time modulation.

A 10 kilocycle per second oscillator 122 applies its output to two 45° phase shifters 123 and 124 resulting in two 10 kilocycle per second sine-waves 90° apart appearing at the outputs thereof. The output of one of the 45° phase shifters 123 is applied to the input of another Schmitt trigger circuit 125. The output of the Schmitt trigger circuit 125 is connected to two counting flip flops 126 and 127 connected in cascade. The output of the second flip flop 127 is connected to a linear sawtooth generator 128 whose output is connected to each of the modulating Schmitt trigger circuits 121. The modulating Schmitt trigger circuits 121 are of a conventional type having a single input terminal. The sine-wave from the signal splitter 120 and the sawtooth pulses from the sawtooth generator 128 are added in the input of the Schmitt trigger circuit 121 by means of a simple resistive adding circuit made up of two equal-value resistors having a common terminal joined at the Schmitt trigger circuit 121 input. The other end of one resistor is connected to the signal splitter 120 while the remaining end of the second resistor is connected to the sawtooth generator 128. The outputs of the modulating Schmitt trigger circuit 121 are connected to the synchronizing input of a different free running multivibrator 130; the multivibrator frequency is nominally 10 kilocycles per second but is synchronized by the output of the Schmitt trigger circuit 121. Two phase detector circuits 131 and 132 are provided for each of the multivibrators 130, one being connected to the nominal output indicated by Q and the other being connected to the complementary output indicated by $\overline{Q}$. The output of each pair of phase detectors 131 and 132, forms one set of control voltages for application to one of the phase shifters 68.

Referring now to the wave forms shown in FIG. 28 taken in conjunction with the block diagram of FIG. 13, the phase signal former 67 operates as follows: The 10 kilocycle per second sine-wave applied to the input of the Schmitt trigger 125 from the 10 kilocycle per second oscillator 122 is indicated by the wave form 135. The trigger circuit 125 produces at its output a train of trigger pulses as indicated by the wave form 136. These trigger pulses derive from the 10 kilocycle sine-waves and therefore have a repetition rate of 10,000 pulses per second. The first flip flop 126 counts by two to produce a train of pulses at its output at a repetition rate of 5,000 pulses per second as indicated by wave form 137. The second flip flop 127 counts by two also to produce a train of pulses at a rate of 2500 pulses per second as indicated by wave form 138. The pulses from the second flip flop 127 trigger the linear sawtooth generator 128 to produce a train of sawtooth pulses at the rate of 2500 pulses per second, shown in FIG. 28 as wave form 140.

The modulating Schmitt trigger circuit 121 produces time-modulated output pulses in a generally conventional manner. Time modulation is discussed in Chapter 13 of the book entitled Wave Forms which is vol. 19 of the MIT Radiation Laboratory series published in 1949 by the McGraw-Hill Book Company, Inc. The conventional Schmitt trigger circuit 121 corresponds to the block labeled "amplitude comparison circuit" in FIG. 13–2(a) of that book (page 468). The output of the Schmitt trigger circuit is indicated by wave form 141 and one output pulse is produced for each of the sawtooth input pulses but the relative time of occurrence of these pulses varies back and forth in accordance with the input modulating signal applied to the Schmitt trigger circuit 121. This modulating signal has a frequency of approximately 2 cycles per second as was stated hereinbefore and is related to the rotation of the satellite 50 about the spin axis 51, as corrected by the additional pulses applied by the clock 63 and the external control 64. These time-modulated pulses having a repetition rate of approximately 250 pulses per second are applied as synchronizing pulses to the free running 10 kilocycle per second multivibrator 130 and, hence, synchronize the output pulses from the multivibrator 130 once every four multivibrator cycles.

Figure 28:
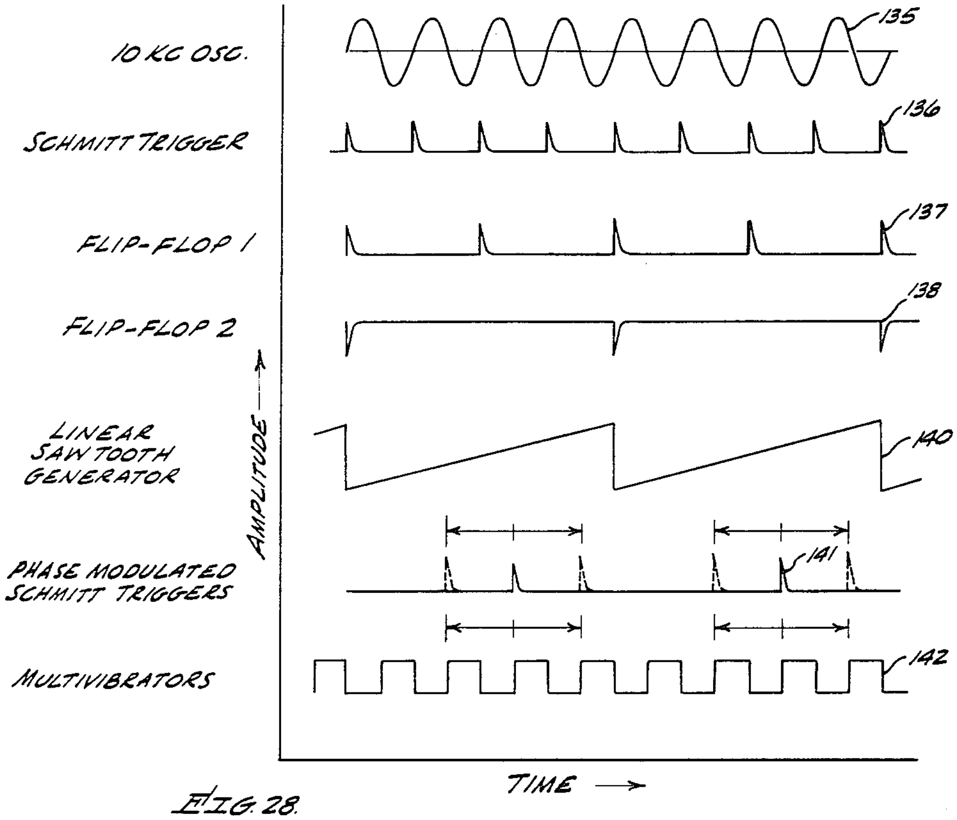
FIG. 28 is a diagram of pulse modulation waveforms occurring in the phase control signal former of FIG. 13.

Because the synchronizing pulses of wave form 141 are time-modulated in a sinusoidal manner, the pulse train from the multivibrator 130 is also time-modulated, as indicated by wave form 142 in FIG. 28. Because the pulse train from the multivibrator 130 has a rate of 10,000 cycles per second, while the modulating frequency is approximately 2 cycles per second, there is very little difference in the relative time of occurrence of successive pulses or groups of pulses, as it requires ½ second for the pulse modulation to go through one complete cycle, in which time 5,000 pulses have been generated by the multivibrator 130. The parameters of the circuits are arranged such that the modulation amounts to 360° change of the 10 kilocycle per second square wave 142. Thus, as indicated by the arrows, under modulation the pulses gradually change their time of occurrence by moving from the normal or center position progressively to the position of the adjacent pulse on one side, back through the center to the position of the pulse on the other side and back to the center. Because of the 22½° phase displacement of the sine wave signals applied to the Schmitt trigger circuit 121, each of the different multivibrators 130 is displaced by 22½° in the modulation cycle of its output pulses.

The 10 kilocycle per second sine wave from the oscillator 122 is applied to each pair of phase detectors 131 and 132 in phase quadrature. The phase detectors 131 and 132 sample the 10 kilocycle sine wave as indicated in FIG. 10, which was briefly described previously. The 10 kilocycle sine waves correspond to wave form 81, and the train of sampling pulses from the multivibrator 130 correspond to wave form 80. Wave form 80 is dotted in several places to indicate the relative position of the square wave pulses with respect to the sine wave 81 during different portions of the modulation cycle.

The nature of the signals produced in one of the phase detector circuits 131 or 132 is indicated by the wave forms in FIG. 10 which indicates the samples of the 10 kilocycle sine wave 81 may be taken at any portion of the cycle, but that the change from the sampling of different portions occurs relatively slowly with respect to sine wave 81. Thus, there are 5,000 sampling pulses during the time it takes for the phase modulation to return to the same point of sampling. The sampled signals of wave form 82, FIG. 10, are integrated in the phase detectors 131 and 132 to provide the phase control signals shown in FIG. 11, where wave form 150 represents the output of the first phase detector 131 and wave form 151 represents the phase of the second output detector 132. Similarly, the other pairs of phase detectors 131 and 132 provide control signals having the same wave shape as waveform 150 and 151 but displaced in phase by 22½° from the control signals produced by the preceding pairs of phase detectors 131 and 132.

Figure 14:
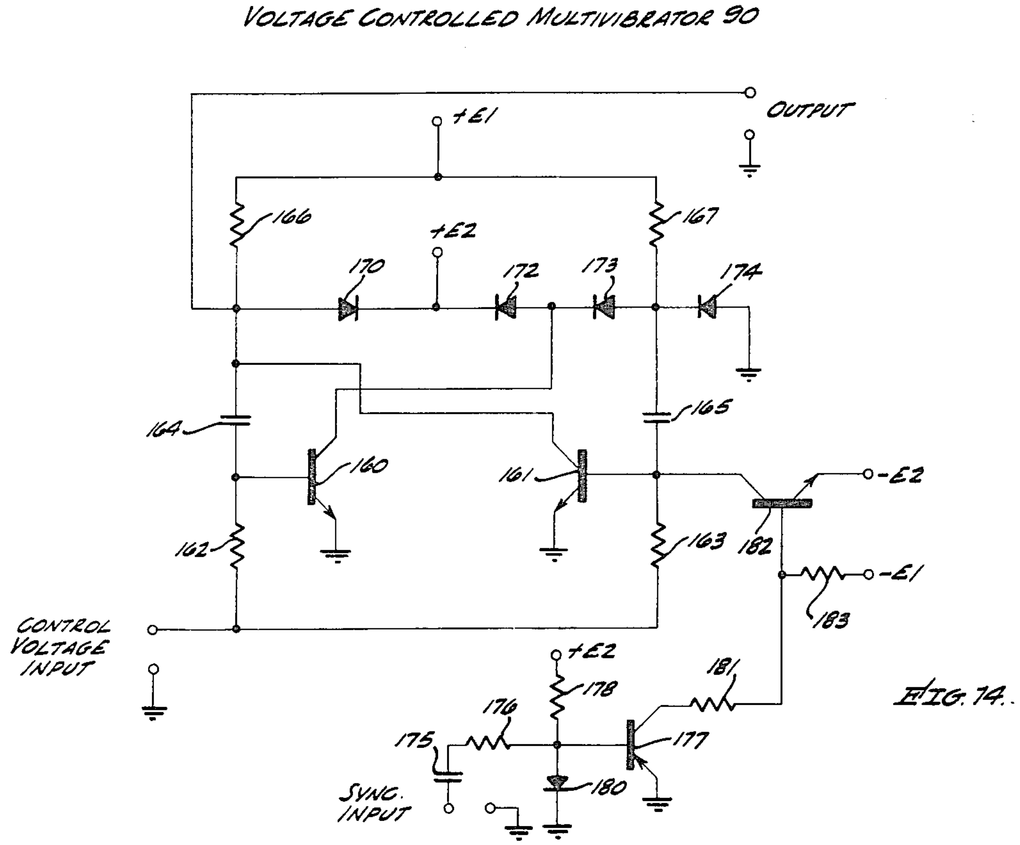
FIG. 14 is a schematic circuit diagram of the voltage controlled multivibrator of the vernier pulse generator of FIG. 12.

Now that the operation of the overall phase control system has been described, certain ones of the individual circuits will be described in more detail. Referring to FIG. 14, the voltage controlled multivibrator 90 comprises two transistors 160 and 161 connected in grounded emitter configuration. The base of each of the transistors 160 and 161 is connected to the control voltage input through resistors 162 and 163, respectively. The collectors are cross-coupled through respective capacitors 164 and 165 to the base of the opposite one of the transistors 160 and 161. The collectors are also connected through resistors 166 and 167 to a source of operating potential designated as +E1 which is +24 volts in the present example, the negative side of which is connected to ground. The output of the voltage controlled multivibrator 90 is taken from the collector of transistor 161. The collectors of the transistors 160 and 161 are clamped by a pair of diodes 170 and 172 to a reference potential indicated as +E2 in FIG. 14 which in the present example is 6 volts. In addition, to aid in synchronism of the voltage controlled multivibrator 90, a diode 173 is inserted in series in the connection from the collector of transistor 160 to the base of transistor 161. That is, the cathode of the diode 173 is connected to the collector of transistor 160, while the anode is connected to the junction of capacitor 165 and resistor 167. An additional diode 174 has its cathode connected to that same junction and its anode connected to ground, and functions as a ground clamp.

The negative-going synchronizing pulses from the pulse source 61 are applied through a series capacitor 175 and resistor 176 to the base of a grounded emitter transistor 177. The base of the transistor 177 is also connected through a resistor 178 to the source of positive reference potential +E2, and is also connected to the anode of a ground clamp diode 180 having a grounded cathode. The collector of transistor 177 is connected through a series resistor 181 to the base of a transistor 182 which has its collector connected directly to the base of transistor 161 of the bistable pair. The base of transistor 182 is also connected through a pull-down resistor 183 to a source of negative reference potential designated −E1 which is −6 volts in the present example. The emitter of transistor 182 is connected to a source of negative operating potential designated as −E2 which is −24 volts in the present example, the positive terminal of this source of potential being connected to ground. In operation, transistors 160 and 161 operate as a free-running or astable multivibrator in the conventional manner. However, the frequency at which the multivibrator oscillates is determined by the control voltage applied to the bases of the transistors 160 and 161 through resistors 162 and 163, respectively. As the voltage is increased, the slope of the RC charging potential across the capacitors 164 and 165 is increased so that the triggering level is reached sooner, hence, causing the output frequency to increase. Conversely, when the control voltage is decreased, the capacitors 164 and 165 charge more slowly on a less steep slope and it requires a longer time for the triggering level to be reached, resulting in a lower frequency from the multivibrator.

The synchronizing pulses applied through transistors 177 and 182 force the multivibrator 90 into a particular one of its two stable states if it is not there already, so that the output of the voltage controlled multivibrator 90 always starts off with a high signal at the time of occurrence of one of the reference pulses from the pulse source 61.

Figure 15:
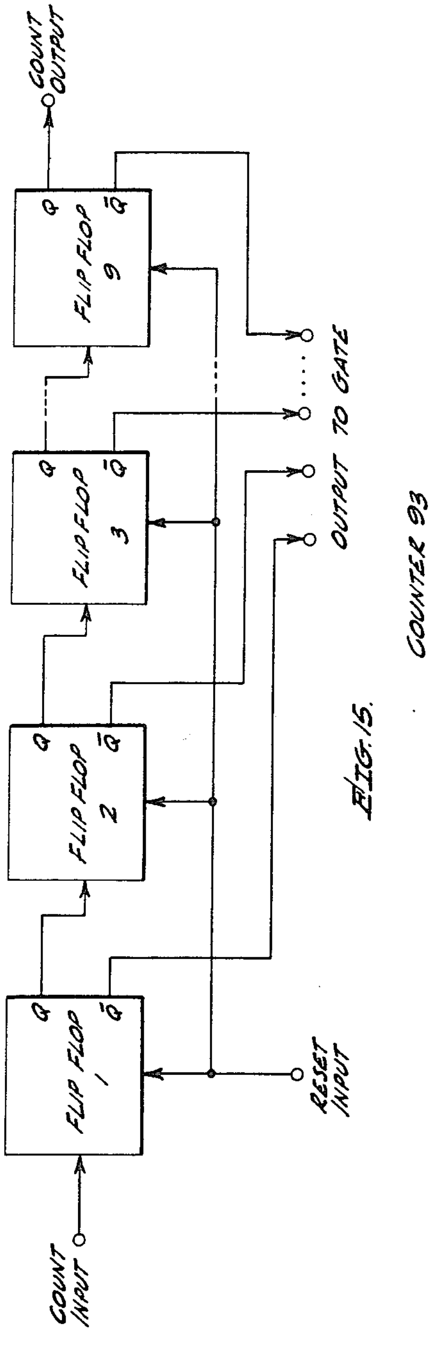
FIG. 15 is a block diagram of the counter in the vernier pulse generator of FIG. 12.

Referring now to FIG. 15, the pulse counter 93 may be seen to be a conventional 9-stage flip flop counter. The flip flops are of the type in which each input pulse is applied to both the set and reset inputs so that each pulse applied to the input of a flip flop causes it to change state. The Q output of each flip flop is applied to the input of each succeeding flip flop in the chain. The complementary or $\overline{Q}$ output of each of the flip flops is applied to the gate 98 of the vernier pulse generator 62 shown in FIG. 12. The 9 flip flops in the counter 93 are each connected to a reset terminal so that a reset pulse applied there resets each of the 9 flip flops into its zero state.

Figures 17, 18:
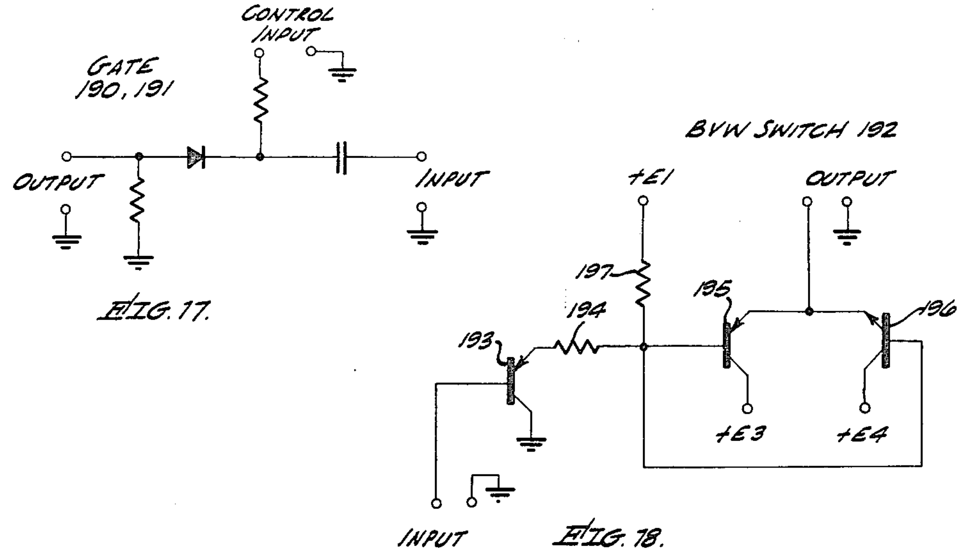
FIG. 17 is a schematic circuit diagram of the gate circuit utilized in the frequency controller of FIG. 16.
FIG. 18 is a schematic circuit diagram of a binary voltage weighter switch utilized in the frequency controller of FIG. 16.
Figure 16:
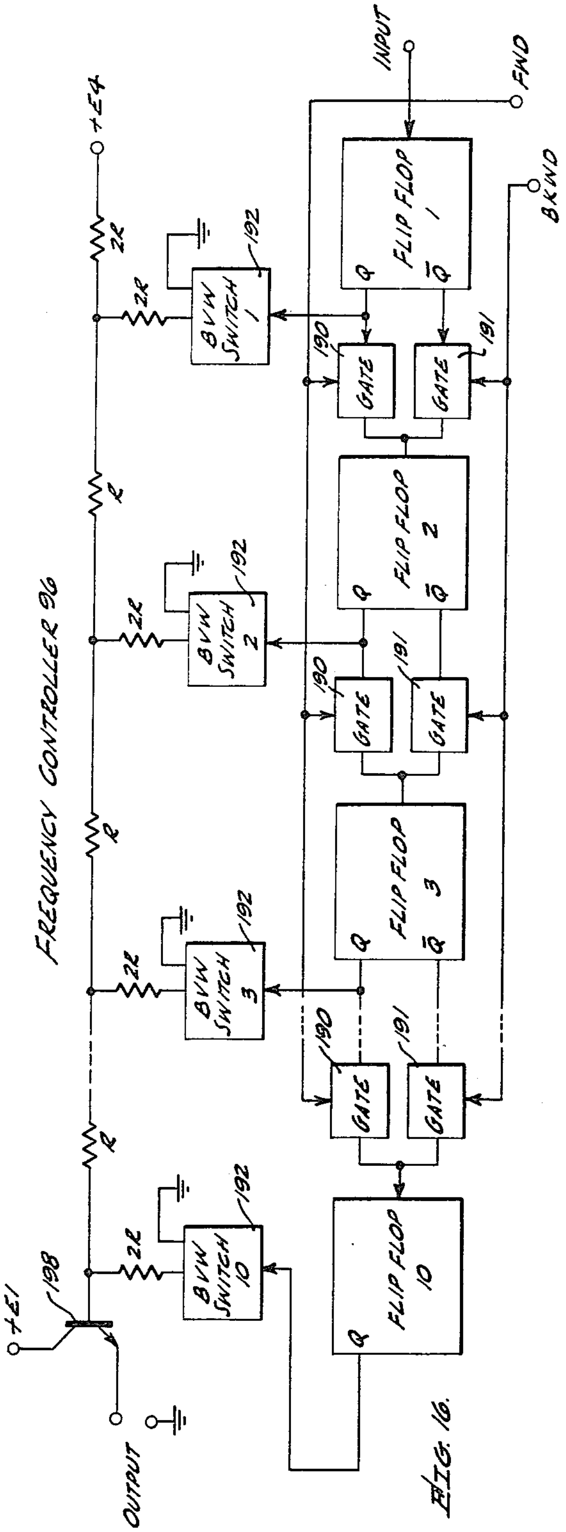
FIG. 16 is a diagram, partly schematic and partly in block form, of a frequency controller utilized in the vernier pulse generator of FIG. 12.

The frequency controller 96 of the vernier pulse generator 62 is shown in FIG. 16 and as described hereinabove converts input pulses into an output analog control voltage which is applied to the voltage control multivibrator 90. The basic element of the frequency controller 96 is a forward-backward counter utilized in conjunction with a binary voltage weighter resistor ladder network. The forward-backward counter is comprised of 10 flip flop stages with gating between the stages. The input of each flip flop is connected to both the set and reset terminals therein so that the flip flop changes state for each pulse applied to its input. However, the output from the flip flop to the input of the next succeeding flip flop in the chain may be either the Q or $\overline{Q}$ output depending upon the condition of the gates. As will be seen in FIG. 16, each flip flop stage except the terminal or most significant one has its Q output connected as input to a forward counting gate 190, while the $\overline{Q}$ output is connected as input to a backward counting gate 191. The outputs of the respective pairs of gates are commonly conected to the input of the next higher order flip flop. Thus, when a pulse is applied to the counter input while the forward count terminal is energized, the forward count gates 190 will be opened and Q outputs of each of the flip flops will be connected to the input of the next succeeding flip flop. When the backward count terminal is energized, the backward count gates 191 will be enabled to connect the $\overline{Q}$ outputs of the flip flops to the inputs of the succeeding flip flops. In this manner, pulses can be added or subtracted from the forward-backward counter, that is, the forward-backward counter will either increase its count or decrease its count when input pulses are applied, depending upon whether the forward or backward control terminals are energized. The gates 190 and 191 are conventional pulse pedestal diode gates and are illustrated in FIG. 17. The input of the gate is connected to a capacitor and diode in series with the output thereof, the diode having its cathode connected to the input side. A resistor is connected to the anode of the diode in parallel with the output terminals, and a second resistor is connected from the junction of the capacitor and the cathode of the diode to the control input teminal.

The Q outputs of each of the flip flops in the backward-forward counter are connected through a binary voltage weighter (BVW) switch 192 to independent resistors designated in FIG. 16 as 2R, which is 200,000 ohms in the present example. The other end of each of the resistors is joined by a series of resistors designated in FIG. 16 as R, which is 100,000 ohms in the present example.

The resistors R and 2R form a ladder network of the type which weights signals applied by the BVW switches 192 in a binary fashion. This type of operation for digital-to-analog conversion is in general known, as indicated by the U.S. patent to S. Hansen, No. 2,718,634, issued Sept. 20, 1955, on "A Digital-to-Analog Converter" and by the networks shown and described in Chapter 5 of the book Notes on Analog-to-Digital Conversion Techniques, edited by Alfred K. Susskind and published by the Technology Press of the Massachusetts Institute of Technology in 1957. The BVW switches 192 are shown in FIG. 18 of the drawings where it may be seen that the input is connected to the base of a transistor 193 whose collector is grounded. The emitter is connected through a resistor 194 to the bases of two additional transistors 195 and 196. The junction of the resistor 194 and the bases of the transistors 195 and 196 is connected through a resistor 197 to a source of positive operating potential with respect to ground, designated at +E1 and which is, in the present example, 24 volts. The second transistor 195 has its collector connected to a +3 volt positive biasing potential designated as +E3 in FIG. 18 while the collector of the third transistor 196 is connected to a higher positive potential of +8 volts, designated as +E4. The emitters of the second and third transistors 195 and 196 are connected together and to the output terminal of the BVW switch 192. The BVW switches 192 operate such that when a one or high signal is applied to the input, +8 volts is applied to output terminals. When a low signal is applied to the input of the BVW switches 192, +3 volts is applied to the output terminal. Hence, when the counter is in a zero state, all of the BVW switches 192 connect +3 volts to their respective resistors of the ladder network. At the count of one, flip flop 1 connects +8 volts to its associated resistor. At the count of two, that resistor is again connected to +3 volts and the next resistor is connected to +8 volts. The least significant end of the network is connected through another 2R resistor to the +E4 potential of +8 volts and the most significant end of the network is connected to the base of a transistor 198 whose emitter is connected to the output terminal of the frequency controller 96. The collector of the transistor 198 is connected to the 24-volt positive operating potential +E1. As the BVW switches 192 are actuated in a progressive binary manner according to the count in the flip flops, the voltage appearing at the output terminals is an analog DC voltage whose amplitude is proportional to the count in the forward-backward counter. Because of the weighting of the resistors the first flip flop causes a voltage change at the output of $\frac{1}{512}$ of the amount of change at the output caused by the most significant or tenth flip flop.

Figure 19:
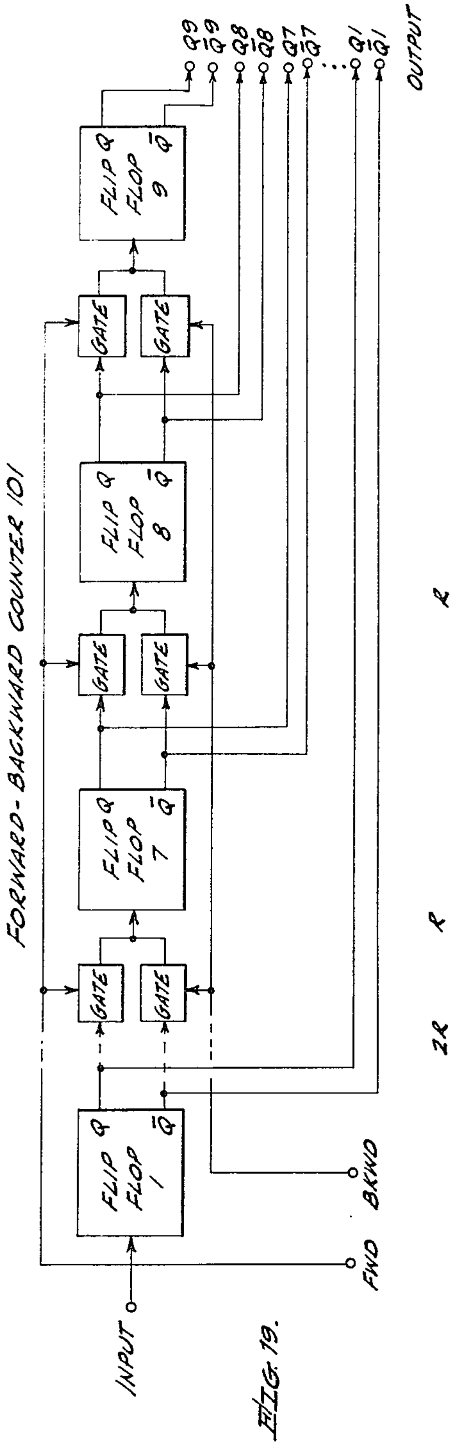
FIG. 19 is a block diagram of a forward-backward counter utilized in the vernier pulse generator of FIG. 12.

The forward-backward counter 101 of the vernier pulse generator 62 is illustrated in FIG. 19 of the drawings and will be seen to be similar in configuration to the forward-backward counter utilized in the frequency controller 96. The forward-backward counter 101 has nine flip flop stages with gating between the stages. However, both the Q and $\overline{Q}$ outputs are taken from each of the flip flop stages. As may be seen in FIG. 8, the output of the forward-backward counter 101 in the vernier pulse generator 62 is connected to the input of a zero-degree-phase sine wave synthesizer 65 and a ninety-degree phase sine wave synthesizer 66.

Figures 20, 21, 22, 23:
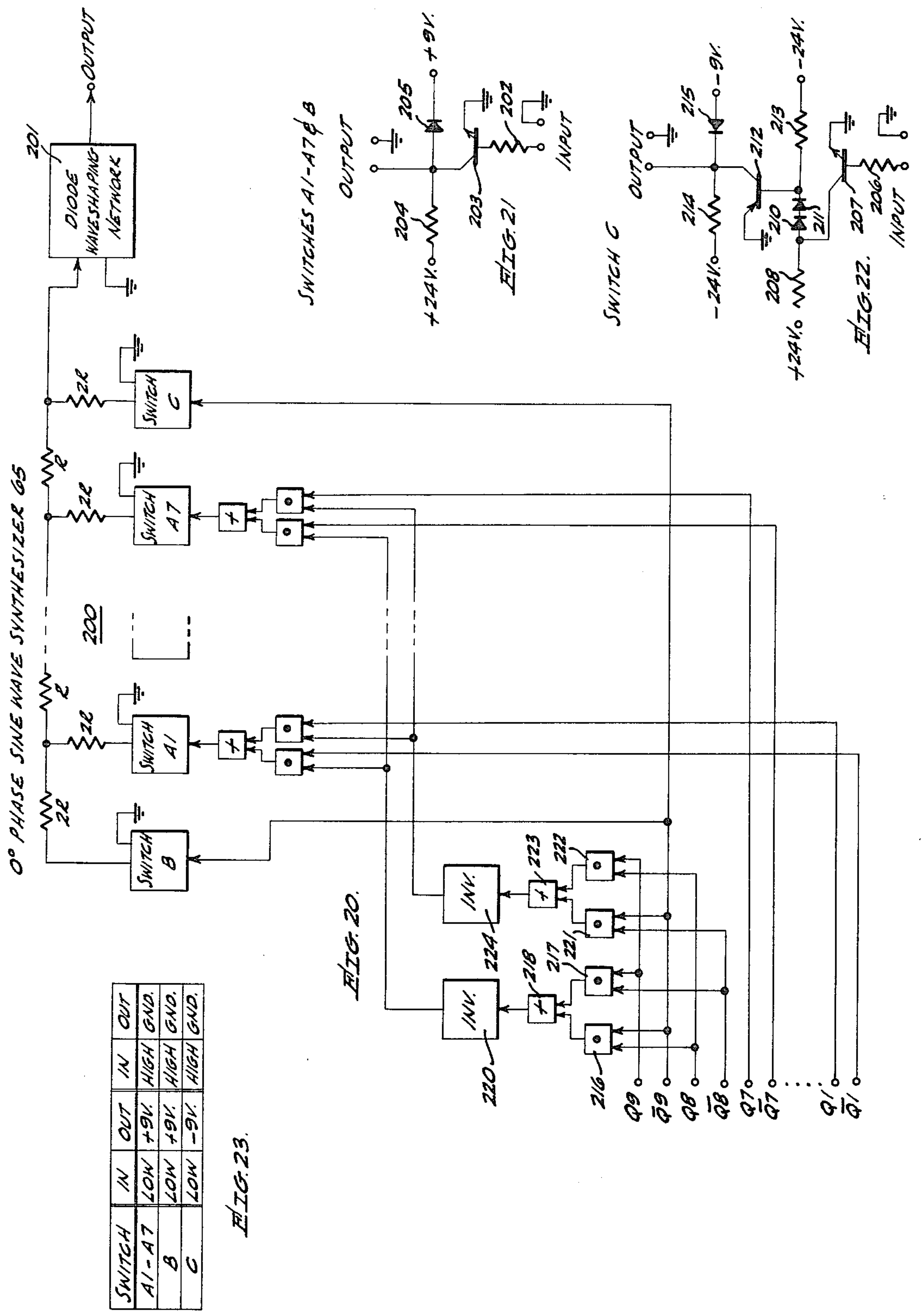
FIG. 20 is a diagram, partly schematic and partly a block diagram, of a zero degree phase sine wave synthesizer utilized in the antenna phasing control circuit of FIG. 8.
FIG. 21 is a schematic circuit diagram of switches A–1 through A–7 and B of the sine wave synthesizer of FIG. 20.
FIG. 22 is a schematic circuitry diagram of a switch C utilized in the sine wave synthesizer of FIG. 20.
FIG. 23 is a diagram indicating the output signals from the switches in the sine wave synthesizer of FIG. 20 for different input signals.

The details of the zero-degree sine wave synthesizer 66 are shown in FIG. 20. This circuit comprises a binary voltage weighter network 200 and associated switches designated A–1 through A–7, B and C. The switches designated A–1 through A–7 are associated with the first seven flip flop stages of the forward-backward counter 101. Switch B is connected to the least significant end of the network 200 through a resistor designated 2R. Next in succession, each of the switches A–1 through A–7 are connected into the network 200 through a resistor 2R, each of these resistors being separated by a resistor designated R. Switch C is connected through a resistor 2R at the output end of the network 200 which is connected to the input of the diode wave-shaping network 201. As in the frequency controller 96, the resistors labeled 2R have twice the value of resistors labeled R, and R is equal to 100,000 ohms.

The nature of switches A–1 through A–7 and B is shown in the schematic circuit diagram of FIG. 21. The input is connected through a resistor 202 to the base of a transistor 203 whose emitter is grounded. The collector is connected to the output terminal and a source of positive operating potential of +24 volts is connected to one end of a resistor 204. The other end of the resistor 204 is connected to the collecter of transistor 203. Additionally, a reference voltage of +9 volts is connected through a diode 205 to the collector of the transistor 203, the cathode being connected to the +9 volt reference voltage and the anode being connected to the collector.

Referring now to FIG. 23 which indicates the conditions for switches A–1 through A–7 and B, when the input of switches A–1 through A–7 and B is low or ground, the output is +9 volts and when the input is high, the output is ground.

Switch C is shown in the diagram designated FIG. 22. The input is connected through a resistor 206 to the base of a transistor 207 whose emitter is connected to ground. The collector is connected through a resistor 208 to a source of positive operating potential of +24 volts. The collector is also connected through a pair of series diodes 210 and 211 to the base of a second transistor 212. The base of this transistor 212 is also connected through a resistor 213 to a source of a negative potential of −24 volts, whose positive terminal is connected to ground. The emitter of the second transistor 212 is connected to ground and the collector is connected to the output terminal. The negative operating potential of −24 volts is connected through a resistor 214 to the collector of the transistor 212 and a −9 volt reference potential is connected through a diode 215 to the collector of transistor 212, the cathode being connected to the collector.

Referring now to FIG. 23, when the input of switch C is low to ground, the output is −9 volts and when the input is high, the output is ground.

Referring back to FIG. 20, there are provided two AND gates 216 and 217, the first AND gate 216 has its input connected to the $\overline{Q9}$ and Q8 output from the forward-backward counter 101. The second AND gate 217 has its input connected to the Q9 and $\overline{Q8}$ outputs of the forward backward counter 101. Thus, when the condition of the eighth and ninth flip flops in the forward backward counter 101 are different or opposite, one or the other of the AND gates 216 and 217 will produce a signal at its output. The outpults of the two AND gates 216 and 217 are connected through an OR gate 218 to an inverter 220. These gates may be conventional diode gates such as shown in Patent 2,803,401.

The inverter 220 is a conventional circuit providing 180° phase inversion, as represented by one stage of vacuum tube amplification, for example. That is, when the input is low or ground, the output is high, and when the input is high, the output is low or ground.

To additional AND gates 221 and 222 are connected in like fashion with an OR gate 223 and inverter 224. One of the AND gates 221 is connected to the $\overline{Q8}$ and $\overline{Q9}$ output of the forward backward counter 101, while the other AND gate 222 is connected to the Q9 and Q8 output of the backward-forward counter 101. Thus, when the eighth and ninth flip flop stages of the backward-forward counter 101 are in like state, either both high or both low, one of the AND gates 221 or 222 will provide a high signal through the OR gate 223 to the input of the inverter 224.

Switches B and C each have their inputs connected to the $\overline{Q9}$ outputs of the backward-forward counter 101. Switches A1–A7 are provided with two AND gates and an OR gate in the same manner as was described as the input of the inverters 220 and 224. One of the AND gates associated with each of the switches A1–A7 is connected to the output of the phase inverter 220, the other termnal of that AND gate being connected to the $\overline{Q}$ output of the associated flip flop stage in the backward-forward counter 101. The second AND gate has one of its inputs connected to the output of the second inverter 224, the second input of that AND gate being connected to the Q output of the associated flip-flop stage in the backward-forward counter 101.

Figure 24:
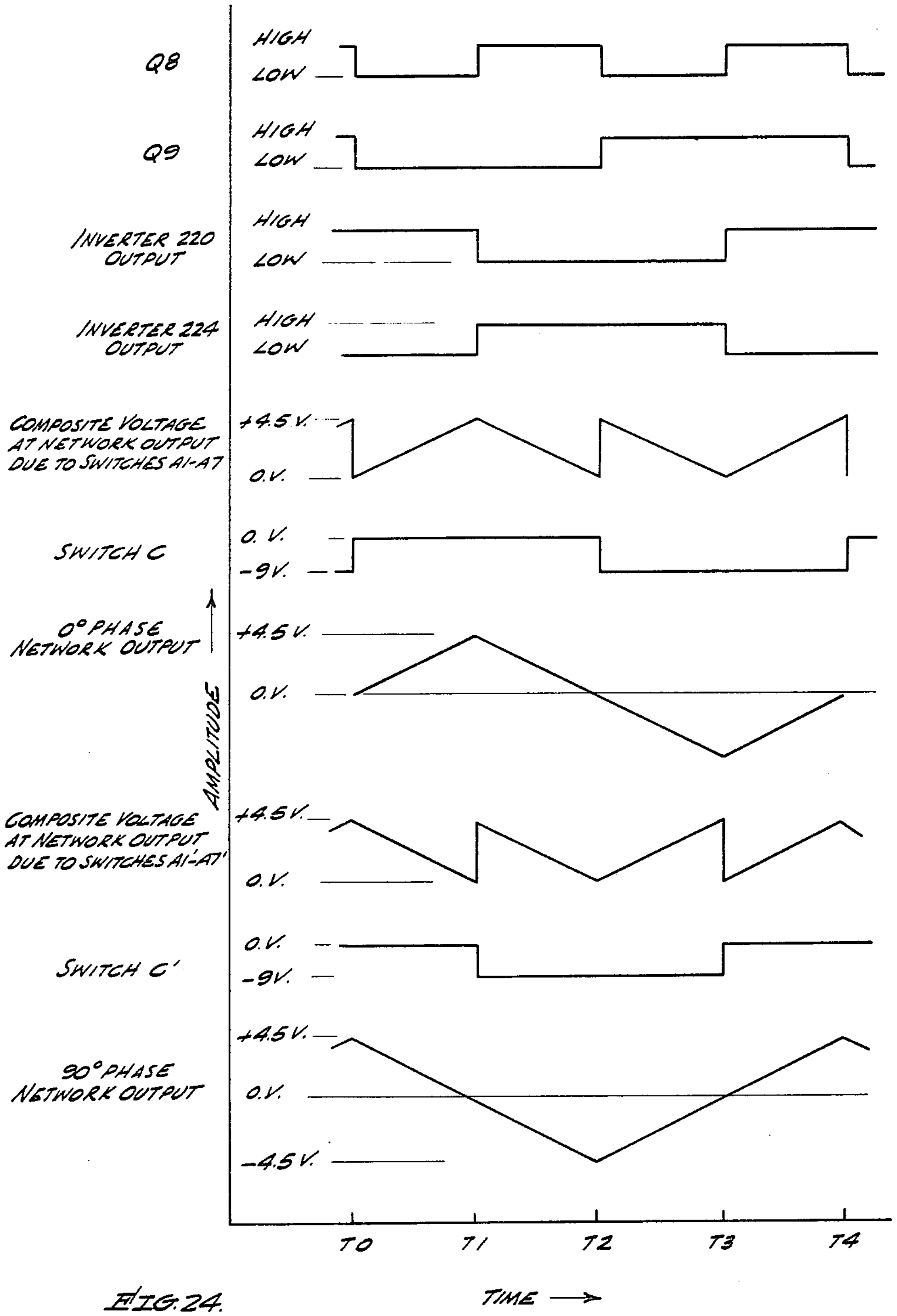
FIG. 24 is a diagram of waveforms occurring in the forward-backward counter of FIG. 19 and in the sine wave synthesizers of FIGS. 20 and 25.

In operation, the zero-degree-phase sine wave synthesizer 65 of FIG. 20 progressively increases and decreases in a step-like manner to produce a stepped triangular wave as the forward-backward counter 101 counts out successive groups of 512 counts. This operation will be described in conjunction with FIG. 9 where waveform 72 represents the 512 pulses counted into the forward-backward counter 101 and wavefrom 73 represents the stepped triangular wave produced at the inputs of the diode wave-shaping networks 201. The description of the operation will be made with further reference to the waveforms of FIG. 24. Initially, at T0 the backward-forward counter 101 is in its zero count condition and the $\overline{Q1}$–$\overline{Q9}$ outputs are high. Consequently, neither of the AND gates 216 and 217 are enabled, the input to the inverter 220 is low and the output is high. AND gate 221 is enabled by the $\overline{Q9}$ and $\overline{Q8}$ signal. Consequently, the input to inverter 224 is high and the output is low. The left hand AND gate associated with each one of the switches A1–A7 is enabled and, accordingly, ground is applied by these switches to the network 200. Switches B and C, whose input is connected to the $\overline{Q9}$ terminal of the forward-backward counter 101 also connect ground to the network. Thus, initially, ground is applied at each input to the network 200 and the output is zero volts. The first count registered in the forward-backward counter 101 changes the state of flip flop 1 causing the input of switch A1 to go low, resulting in the application of +9 volts to the network in the next to the least significant position. Consequently, the voltage at the output of the network 200 rises one step. Similarly, the second count in the forward-backward counter 101 causes switch A1 to reconnect ground to the network and switch A2 applies +9 volts to the network at a position closer to the output thereof, resulting in a higher voltage appearing at the output of the network 200. In a similar manner, as further counts are registered in the forward-backward counter 101, the voltage at the output of the network progressively steps upward in increments until the 127th count is reached. At the 127th count, the first seven flip flops of the forward-backward counter 101 are in the one or high state and the eighth and ninth flip flops are in the zero or low state. Accordingly, each of the switches A1–A7 is applying +9 volts to the network 200 while switches B and C apply ground thereto. This point is indicated in the waveform diagram 73 by reference numeral 230. At time T1 the 128th count resets the first seven flip flops to zero and shifts the eighth flip flop into the one state. Accordingly, AND gate 216 is enabled and applies a high signal to the input of inverter 220, resulting in a low signal at its output and both of the AND gates 221 and 222 associated with the inverter 224 are inhibited so that a low signal at the input of inverter 224 appears as a high signal at the output thereof. The inputs to switches A1–A7 are low so that the +9 volts remains applied to the network 200, thereby and switches B and C continue to apply ground to the network 200. Accordingly, there is no change in the output waveform in shifting from the 127th count to the 128th count, as indicated by the position 231 in FIG. 9. The 129th count causes flip flop 1 to change into the one state, resulting in the right hand AND gate being enabled to put a high signal at the input of switch A1, resulting in the application of ground to the network 200. Accordingly, the output potential decreases by the amount formerly contributed when +9 volts was applied at that position in the network 200. Similarly, the 130th count results in the flip flop 1 returning to the zero position and flip flop 2 changing to the one position, resulting in switch A1 reapplying the +9 volt potential to the network 200 and switch A2 applying ground thereto. In like manner, as succeeding counts are entered into the forward-backward counter 101, the switches A1–A7 switch in a progressive binary fashion to cause a decreasing stepped waveform until at the 255th count, all of the switches A1–A7 are providing ground potential to the network 200. Switches B and C continue to provide ground potential to the network 200 and, accordingly, the output of the network 200 is zero volts. At this time, flip flops 1–8 in the backward-forward counter 101 are in their one position, while flip flop 9 is in its zero position. The 256th count resets flip flops 1–8 into their zero position and sets flip flop 9 into the one state. AND gate 217 is enabled to cause the input of inverter 220 to remain high and the output thereof to remain low. Similarly, AND gate 221 and 222 remain inhibited so that the input of inverter 224 remains low and its output remains high. However, each of the switches A1–A7 find their inputs low and, accordingly, apply +9 volts to the network 200 but at the same time, switches B and C find their inputs low and simultaneously apply +9 volts and −9 volts respectively to the network. The result is a partial negative step at the output of the network 200, because of the incomplete cancellation of the positive and negative voltages applied to the network 200 due to the binary weighting at the different positions. If there had been complete cancellation, the waveform would have remained at zero volts for two steps at the time T2, similar to the double step at the time T1. The over-all result is that the negative half cycle of the triangular wave is of slightly larger amplitude than the positive half cycle. The 257th count sets flip flop 1 into the one state, resulting in the input of switch A1 going high and the output switching ground onto the network 200. Accordingly, inasmuch as a portion of the positive signal has been removed from the network which was a portion of the over-all positive voltage that substantially cancels the negative voltage applied to the network 200, the output waveform takes one step downward in the negative direction. At the 258th count switch A1 reapplies the +9 volts to the network 200 and switch A2 removes +9 volts and applies ground. Accordingly, the output voltage again goes negative by another step. In a similar manner, as succeeding pulses are counted into the forward-backward counter 101, the switches A1–A7 progressively switch in a binary fashion to remove more and more of the positive voltage from the network 200, causing the output voltage to continue to step in a negative direction.

At the 383rd count of the forward-backward counter 101, flip flops 1–7 are in their one state, flip flop 8 is in its zero state and flip flop 9 is in its one state. Accordingly, switches A1–A7 have all removed +9 volts from the network 200 and applied ground potential thereto and switches B and C continue to apply +9 volts and −9 volts, respectively, to the network, resulting in the network reaching the maximum negative potential at point 232 of the wave form 73. At the 384th count at time T3, flip flops 1–7 return to their zero state and flip flop 8 changes to its high state, leaving only flip flops 8 and 9 high. Accordingly, AND gates 216 and 217 are inhibited, the input of inverter 220 is low and the output is high. AND gate 222 becomes enabled, the input of inverter 224 goes high and the output low. The left hand AND gates associated with the switches A1–A7 are enabled to permit the input of switches A1–A7 to remain high, resulting in ground continuing to be applied to the network 200 by these switches. Switches B and C continue to apply +9 volts and −9 volts, respectively, and accordingly the wave form remains at the low negative potential for two steps, as indicated at 233 of wave form 73 in FIG. 9. The 385th count causes flip flop 1 to change to the one state, resulting in the application of +9 volts to the network 200 by switch A1. As pulses continue to enter the backward-forward counter 101, switches A1–A7 progressively switch in a binary fashion to add positive increments to the composite output voltage of the network 200, resulting in the stepping of the wave form back toward zero potential. At the 511th count, all nine of the flip flops are in their one state. Switches A1–A7 are all applying +9 volts to the network 200 and switches B and C are applying +9 volts and −9 volts, respectively, to the network 200. Accordingly, the output of the network 200 is a slightly negative voltage equal to only a portion of a normal binary step. When the 512th count enters the backward-forward counter 101, flip flops 1–9 are reset to their zero state, the output of inverter 220 remains high and the output of inverter 224 remains low, the left hand AND gates associated with each of the switches A1–A7 are enabled, resulting in the input to switches A1–A7 being high and ground being applied to the network 200 thereby, switches B and C going high at their input, resulting in ground also being applied to the network 200 at these points. Accordingly, the output signal from the network 200 at the 512th count is zero volts, one cycle of a stepped triangular wave form has been completed and the circuits are reset into condition to repeat the process for the next cycle of 512 counts.

Figure 25:
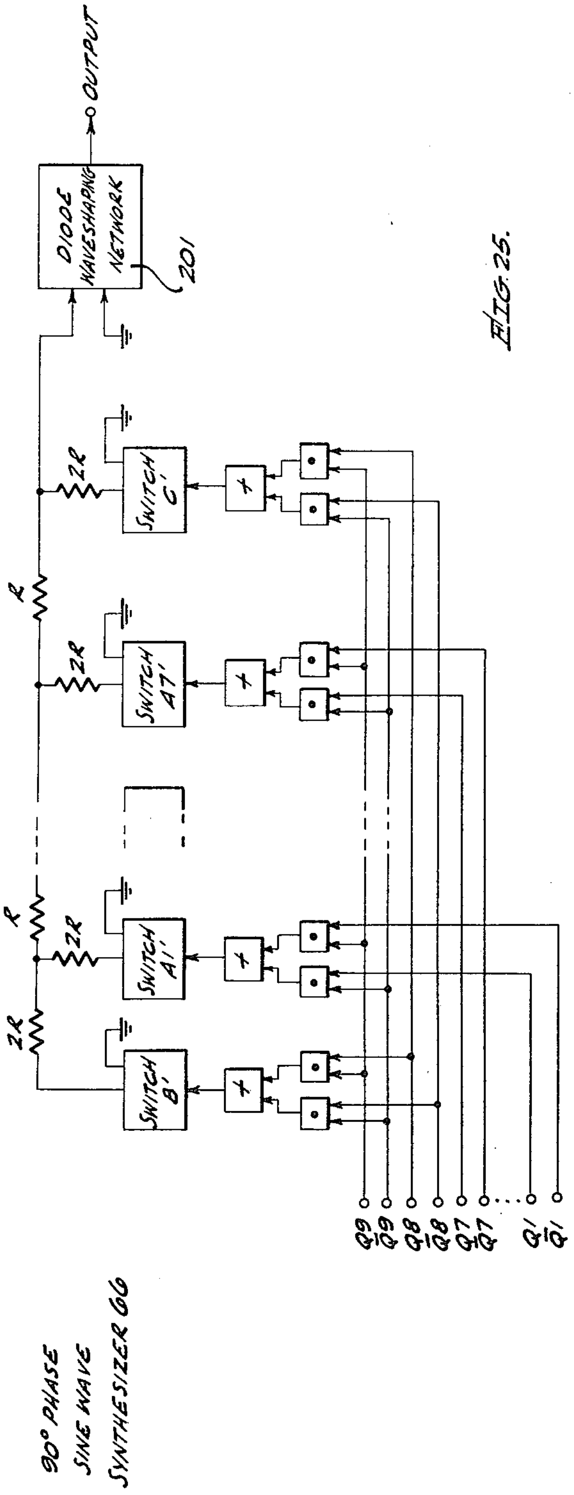
FIG. 25 is a diagram, partly a schematic circuit and partly a block diagram, of the ninety degree phase sine wave synthesizer of the antenna phasing control circuit of FIG. 8.

Referring now to FIG. 25, the ninety-degree phase sine wave synthesizer 66 is similar in arrangement and operation to the zero-degree-phase sine wave synthesizer 65 of FIG. 20. The ninety-degree-phase synthesizer 66 produces a stepped triangular wave form having a shape identical to that shown as wave form 73 in FIG. 9, however, it is displaced ninety degrees in phase with respect thereto, that is, at time T0, when the output of the zero-degree-phase sine wave synthesizer 65 is passing through zero on its way toward the positive maximum, the signal at the output of the ninety-degree-phase sine wave synthesizer 66 is passing through the positive maximum on its way toward zero, as indicated in the waveform diagram of FIG. 24. The ninety-degree-phase synthesizer 66 of FIG. 25 is provided with a network 200 identical to that of the zero-degree-phase synthesizer 65 of FIG. 20, and is also provided with switches A1′–A7′, B′ and C′ identical with the corresponding switches of the zero-degree-phase synthesizer 65. However, switches B′ and C′ are each provided with two AND gates and an OR gate at their input connected in the same manner as the AND gate and OR gate combination at the inputs of the switches A1′–A7′. The input of the left hand AND gate for switch B′ is connected to $\overline{Q9}$ and $\overline{Q8}$ while the right-hand AND gate is connected to Q9 and Q8. The AND gates for switch C′ are connected to the identical terminals of the backward-forward counter 101 as the connections for the gates of switch B′. Switches A1′–A7′ have their left-hand AND gates connected to $\overline{Q9}$ and to the Q output of their associated flip flops in the counter 101. The right-hand AND gates for switches A1′–A7′ are connected to Q9 and the $\overline{Q}$ outputs of their respective associated flip flop stages in the counter 101.

The initial condition at time T0 for the ninety-degree-phase sine wave synthesizer 66 is with switches B′ and C′ connecting ground to the network 200 while switches A1′–A7′ are each connecting +9 volts to the network 200. From time T0 to T1, switches A1′–A7′ progressively remove the positive potentials from the network 200 in binary steps until immediately prior to time T1 all of the switches A1′–A7′, B′ and C′ are connecting ground to the network 200. At time T1, switches A1′–A7′ apply +9 volts to the network 200 while switches B′ and C′ apply +9 volts and −9 volts respectively thereto, providing almost complete voltage cancellation resulting in a partial negative step at time T1. Then switches A1′–A7′ progressively remove positive potentials from the network 200 in binary increments from time T1 to T2 until the maxmium negative potential output is reached at the step prior to T2. Between times T2 and T3 the switches A1′–A7′ again apply positive potentials to the network 200 in a progressive binary manner so that the point of almost complete cancellation of the positive and negative voltages is reached at the step immediately prior to time T3. At time T3 all of the switches A1′–A7′, B′ and C′ apply ground potential to the network 200, resulting in zero volts output therefrom. From time T3 to T4, the switches A1′–A7′, progressively reapply the positive potentials to the network to complete the cycle.

Figure 26:
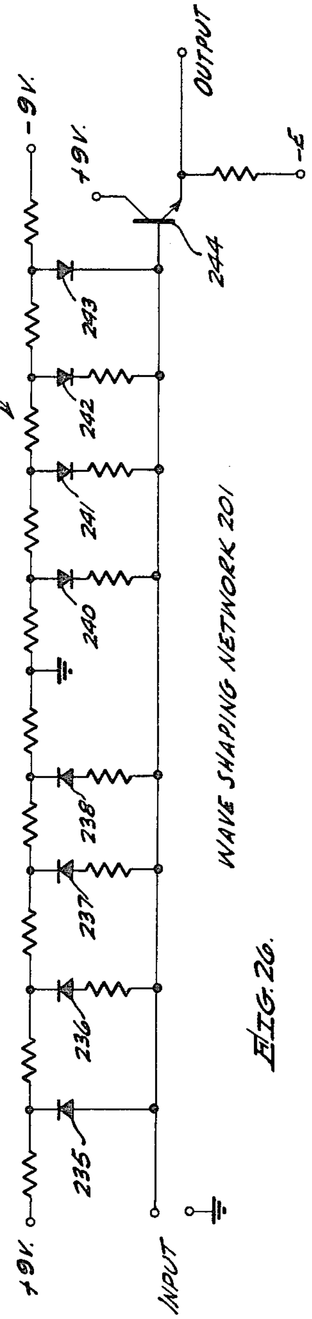
FIG. 26 is a schematic circuit diagram of a wave-shaping network utilized in the sine wave synthesizers of FIGS. 20 and 25.

The diode wave shaper network 201 of the sine wave synthesizers 65 and 66 is illustrated in FIG. 26 of the drawings. It comprises a plurality of diode clamp circuits connected to different clamping potentials so that as the input voltage progressively increases, each of the clamp circuits successively clamps the output voltage to its respective clamping potential, thus rounding the corners of the triangular wave.

Referring now to FIG. 26, a voltage divider 234 is comprised of ten resistors connected in series between the negative terminal (−9 v.) of a source of potential whose positive terminal is connected to ground, and the positive terminal (+9 v.) of a source of potential whose negative terminal is connected to ground. The central point of the voltage divider 234 is connected to ground. Four diodes 235, 236, 237 and 238 have their cathodes individually connected to different junctions between the resistors which are between the ground connection and the positive terminal. Four additional diodes 240, 241, 242 and 243 have their anodes individually connected to different junctions between the resistors which are between the ground connection and the negative terminal. The two outermost diodes 235 and 243 each have their remaining electrode connected to the input terminal directly, while all the remaining diodes 236, 237, 238, 240, 241 and 242 each have their remaining electrode connected to the input terminal through a resistor. The input terminal is also connected to the base of a transistor 244 whose emitter is connected to the output terminal and is also connected through a resistor to a negative terminal of a source of operating potential whose positive terminal is connected to ground. The collector of the transistor 244 is connected to the +9 volt terminal.

The values of the resistors are carefully selected in order to produce as near a perfect rounding of the triangular wave into a sine wave as possible by adjusting the potential to which each of the diodes 235, 236, 237, 238, 240, 241, 242 and 243 successively clamps. Inasmuch as the wave shaping network 201 is symmetrical on either side of the center point at ground, the resistor values are equal for corresponding resistors on either side thereof. The following exemplary resistor values have been found satisfactory in this particular circuit and will be given in order first for the voltage divider 234 beginning from the source of potential and progressing toward ground: 6190 ohms, 215 ohms, 590 ohms, 1150 ohms and 649 ohms. Diodes 236 and 242 are provided with a 24,000 ohm series resistor, diodes 237 and 241 are provided with a 130,000 ohm series resistor, and diodes 238 and 240 are provided with a 390,000 ohm series resistor.

Figure 27:
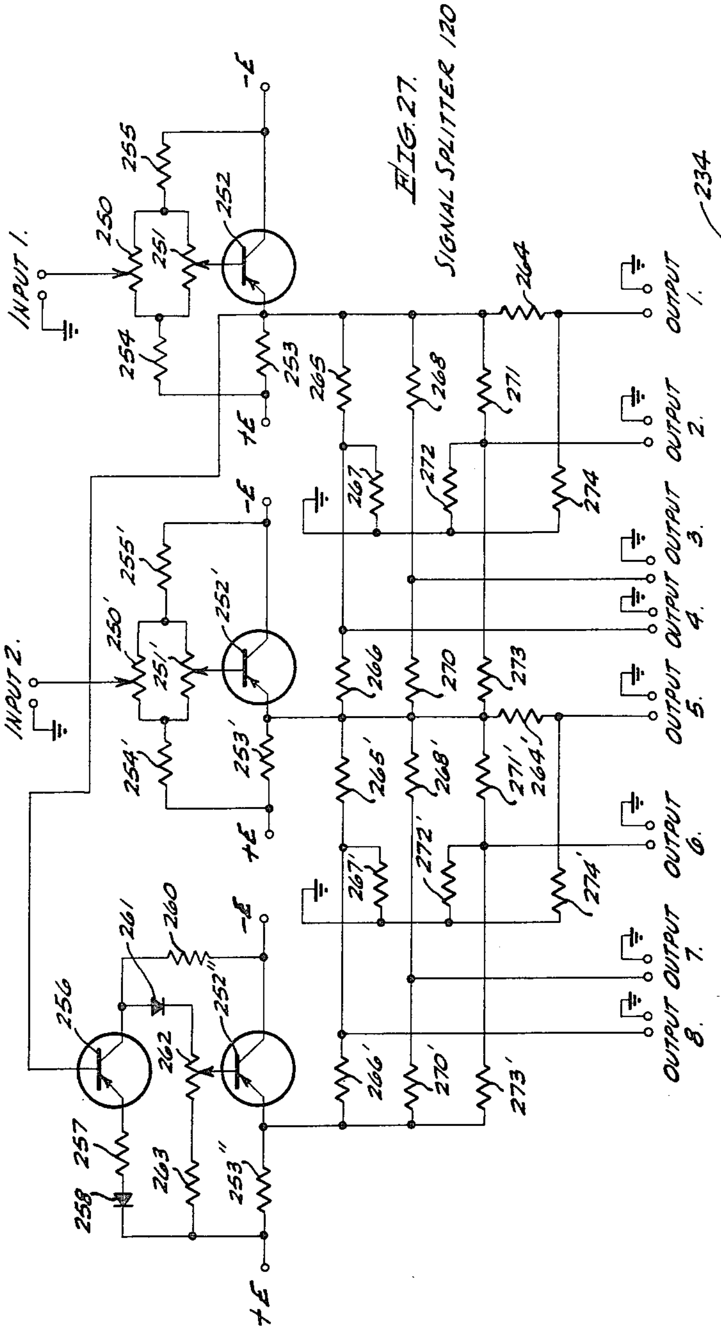
FIG. 27 is a schematic circuit diagram of a signal splitter utilized in the phase control signal former of FIG. 13.

The signal splitter 120 of the phase control signal former 67 is shown in FIG. 27 of the drawing. The signal splitter 120 combines the two quadrature sine waves developed by the sine wave synthesizers 65 and 66 to develop at its outputs eight sine waves progressively displaced in phase by 22.5°. The signal splitter 120 comprises a plurality of resistive adding networks in which various proportions of the input sine waves are combined vectorially to produce the requisite phase displacements. The sine wave synthesizers 65 and 66 are connected to input 1 and input 2 of the signal splitter 120 of FIG. 27. Input 1 is connected to the slider of a first potentiometer 250 which has its outer ends connected in parallel with the outer ends of a second potentiometer 251. The slider of the second potentiometer 251 is connected to the base of a first transistor 252 whose emitter is connected through a resistor 253 to the positive terminal of a source of operating potential, and whose collector is connected to the negative terminal of a source of operating potential. The outer ends of the potentiometers 250 and 251 are individually connected through different resistors 254 and 255 to the positive and negative terminals. By adjusting the potentiometers 250 and 251, the signal amplitude and DC level at the emitter of the transistor 252 can be set. Input 2 is connected to a similar adjustable transistor amplifier circuit designated by primed numbers. The emitter of the first transistor 252 is connected to the base of a third transistor 256 which serves as an inverter stage. The emitter of the third transistor 256 is connected through a series resistor 257 and diode 258, in the order named, to the positive terminal, while the collector is connected through a series resistor 260 to the negative terminal. The diode 258 is poled with its cathode connected to the positive terminal and its anode connected to the transistor 256. The collector of transistor 256 is also connected through a series diode 261, potentiometer 262, and resistor 263, in the order named, to the positive terminal. The diode 261 is poled with its anode connected to the collector of transistor 256 and its cathode connected to the potentiometer 262. The slider of the potentiometer 262 is connected to the base of a fourth transistor 252″ which has its collector connected to the negative terminal and its emitter connected through a resistor 253″ to the positive terminal. Thus, at the emitter of the fourh transistor 252″, the signal is 180° out of phase with the signal at the emitter of the first transistor 252. The load resistors 253, 253′, 253″ for the first, second and fourth transistors 252, 252′ and 252″ are, in the present example 8200 ohms.

The emitter of the first transistor 252 is connected through a 14000 ohm resistor 264 to the zero degree phase output terminal (output 1). In a similar manner, the emitter of the second transistor 252′ is connected through a 14000 ohm resistor 264′ to the 90 degree phase output terminal (output 5). A pair of resitsors 265 and 266 is connected in series from the emitter of the first transistor 252 to the emitter of the second transistor 252′. The first of these resistors 265 has a value of 28,280 ohms while the second resistor 266 has a value of 11,720 ohms. The midpoint of these two resistors 265 and 266 is connected to the 67½ degree phase output terminal (output 4). The midpoint of these two resistors 265 and 266 is also connected through a 100,300 ohm resistor 267 to ground. A second pair of resistors 268 and 270, each of 20,000 ohms, is connected in series between the emitters of the first and second transistors 252 and 252′. The junction of these two resistors 268 and 270 is connected to the 45 degree phase output terminal (output 3). A third pair of resistors 271 and 272 is connected in series from the emitter of the first transistor 252 to ground, their junction point being connected to the 22½ degree phase output terminal (output 2). The first of these resistors 271 has a value of 11,720 ohms while the second resistor has a value of 100,300 ohms. The junction point of these two resistors 271 and 272 is also connected through a resistor 273 of 28,280 ohms to the emitter of the second transistor 252′. The zero degree phase output terminal (output 1) is connected through a 33,800 ohm resistor 274 to ground.

The remaining output terminals, namely 112½ degree (output 6) 135 degree (output 7), and 157½ degree (output 8) phase terminals, are connected to an identical network extending from the emitter of the second transistor 252′ to the emitter of the fourth transistor 252″. The resistors in the second network have the same value and interconnections as the resistors in the first network and the corresponding resistors in the second network are indicated in FIG. 27 by the primed numbers.

Figure 29:
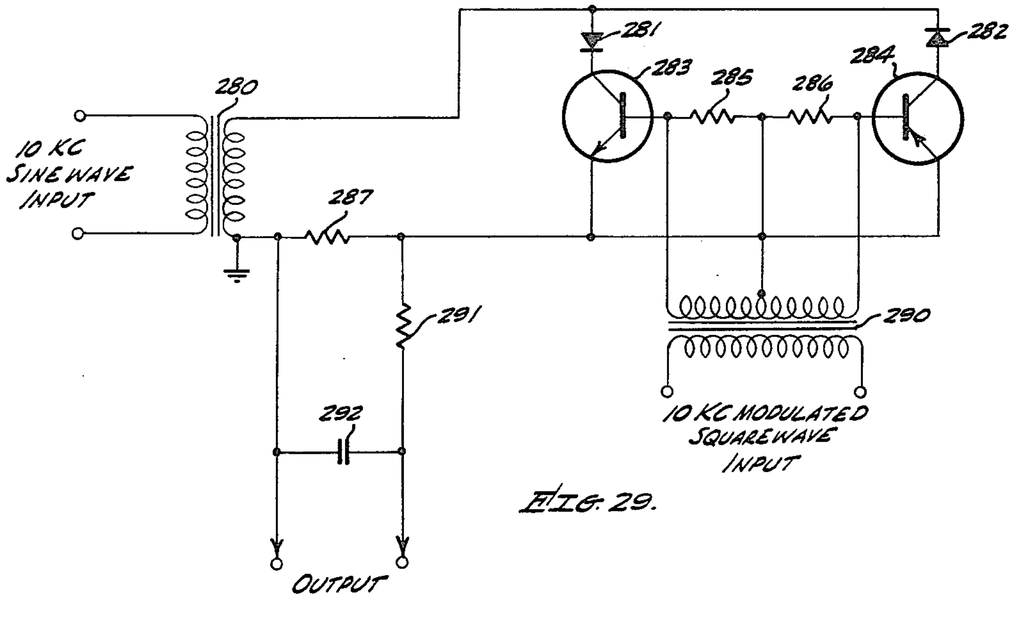
FIG. 29 is a schematic circuit diagram of a pulse modulating Schmitt trigger circuit.
Figure 31:
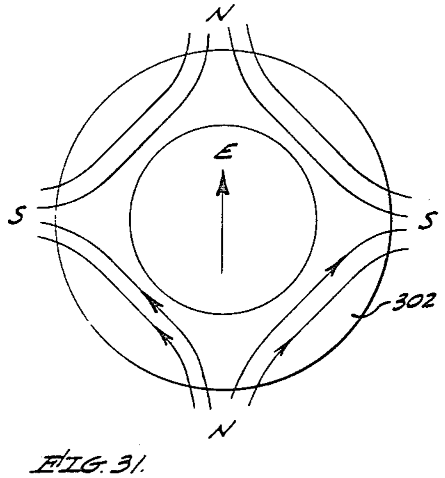

The phase detector 131 and 132 of the phase control signal former 67 is schematically represented in FIG. 29 although many other types of conventional phase detector circuits may be utilized for this purpose. The 10 kilocycle per second sine wave signal from the oscillator 122 which is to be sampled is applied to the primary winding of a transformer 280 whose secondary winding has one end connected to ground and the other end connected to the anode and cathode, respectively, of a pair of diodes 281 and 282. The cathode of the first diode 281 is connected to the collector of a first transistor 283 and the anode of the second diode 282 is connected to the collector of a second transistor 284. The bases of the transistors 283 and 284 are joined by a pair of serially connected resistors 285 and 286. The emitters of the transistors 283 and 284, which are of opposite types, that is to say one is NPN and the other is PNP, are joined together and connected to one end of a load resistor 287 whose other end is connected to ground. The 10 kilocycle per second time-modulated square wave is applied to the primary winding of a second transformer 290. The secondary winding of the transformer 290 has each of its outer ends connected to a different one of the bases of the transistors 283 and 284, and the center tap of the secondary winding of transformer 290 is connected to the emitters of the transistors 283 and 284 and to the junction between the resistors 285 and 286.

In operation, the sampled portions of the 10 kilocycle per second sine wave signal appear across the load resistor 287. This output signal is integrated by a series resistor 291 and parallel capacitor 292 to produce the resultant phase control signal at the output of the phase detectors 131 and 132.

Figure 30:
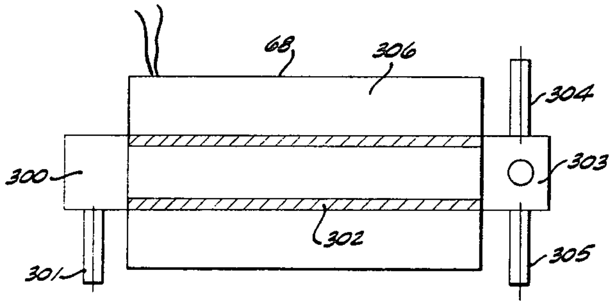

FIG. 30 illustrates schematically the nature of the controllable radio frequency phase shifter 68 utilized in the antenna array control system of the present invention. The phase shifter 68 comprises an input coupler 300 into which radio frequency energy is coupled by the input connector 301. The energy is propagated through a ferrite tube 302 to an output coupler 303 which is a form of turnstile junction and is provided with two output connectors 304 and 305. Around the ferrite tube 302 is an electromagnetic field coil 306 of a two-phase four pole variety. The ferrite tube 302 is shown in enlarged cross section in FIG. 31 indicating the path of the field therethrough. The vertical arrow denotes the electric field vector of a radio frequency wave propagating through the ferrite tube 302. The two control signals in phase quadrature (FIG. 11) applied to the field coil 306 by the antenna phasing control system of the present invention cause the magnetic field to rotate around the ferrite tube 302 in the same manner as the magnetic field rotates in the stator of an electric motor. As will be explained more fully hereinafter, the rotating field produces a phase shift of the radio, frequency wave traveling through the phase shifter 68. The input wave, which is linearly polarized, is rotated through twice the angle of field rotation in the section of ferrite tube 302. The output from the ferrite tube 302 is also a linearly polarized wave. This output wave can be resolved into two counter-rotating circularly polarized components, the phase of one of which is advanced and the other retarded by an amount equal to the rotation angle of the field. The turnstile junction output coupler 303 couples to these two components as will be more fully explained hereinafter. Thus, each of the 8 phase shifters 68 provides two output waves of equal amplitude and having phase shifts of equal magnitude but of opposite sense. The output of each phase shifter 68 is coupled to two diametrically opposite antenna elements 60.

Some advantages of this type of phase shifter 68 are that it has high inherent accuracy when large phase shifts are required since the differential phase shift is determined by the field rotation and is very tolerant to variations in ferrite parameters. Because all sixteen antenna elements 60 are driven by identical phase shifters 68, no temperature compensation is required to account for changes in absolute phase shift. The phase shifter 68 also has the advantage that it is a relatively short device having low loss since the large phase shifts obtained are established by a field rotation angle rather than by propagation through a lengthy medium.

The RF power splitter 70 which interconnects the RF generator or utilization circuit 69 to the phase shifter 68 is shown in FIG. 32. This is a printed circuit device of the flat strip transmission line variety made in accordance with the principles set forth in Chapter 19 of the book Technology of Printed Circuits, by Paul Eisler, published in 1959 in London by Heywood & Company, Ltd., or in Section 4–6 of the book Handbook of Tri-Plate Microwave Components, published by Sanders Associates, Inc., Nashua, New Hampshire, 1956. The power splitter 70 comprises seven ring hybrid junctions of the type generally shown in FIG. 130 of the referenced book. The view of the power splitter 70 in FIG. 32 is taken with the top cover removed to show the configuration of the printed circuit. A circular circuit board 310 of a suitable insulating dielectric material is provided with eight output coaxial transmisson line connectors 311 around the periphery thereof and one input coaxial connector 312. The input connector 312 is connected by means of a printed or plated conductor 313 to the input arm of a first ring hybrid junction 314. The two output arms on either side of the input arm feed the input arms of second and third ring hybrid junctions 315 and 316. The output arms on each side of the input arm of the second ring hybrid junction 315 feeds the input arms of third and fourth ring hybride junctions 317 and 318, while the output arms on each side of the input arm of the third ring hybrid junction 316 feeds the input arms of sixth and seventh ring hybrid junctions 320 and 321. The output arms of all but the first of the devices, namely, the second-seventh, ring hybrid junctions 315, 316, 317, 318, 320 and 321, are individually connected to different ones of the output connectors 311. The ring hybrid junctions 314, 315, 316, 317, 318, 320 and 321 are formed of conductive material printed or plated on the circuit board 310, as are the interconnections therebetween. The fourth arm of each of the ring hybrid junctions 314, 315, 316, 317, 318, 320 and 321 is a dummy arm providing a matched load. These loads are important in obtaining proper antenna operation since they absorb the products of mutual coupling and prevent their re-radiation. The power splitter 70 thus provides RF energy of equal amplitude and phase to each of the phase shifters 68.

The constructional details of the phase shifter 68 are shown in FIGS. 33–36. The phase shifter 68 is based on the adjustable phase changer described in the article entitled "Adjustable Waveguide Phase Changer" by A. Gardner Fox, published in the December 1947 issue of the Proceedings of the Institute of Radio Engineers, and in the article entitled "Behavior and Applications of Ferrites" by A. G. Fox, S. E. Miller and M. T. Weiss, published in the January 1955 issue of the Bell System Technical Journal. The present phase shifter 68 is a 180° differential phase shift section in accordance with the teachings of the above-identified references. It has the property of transmitting dominant waves of one polarization at a different velocity than waves polarized at right angles to the first. The advantage of such a device is that it forms a phase changer that is capable of transmitting substantially 100% of the incident power at high power levels. As described in the article in the Bell System Technical Journal, a magnetically polarized section of ferrite tubing may be used to produce the difference in phase velocities for the two waves polarized at right angles. Rotation of a four-pole field rotates the input wave through twice the angle of field rotation.

Figure 33:
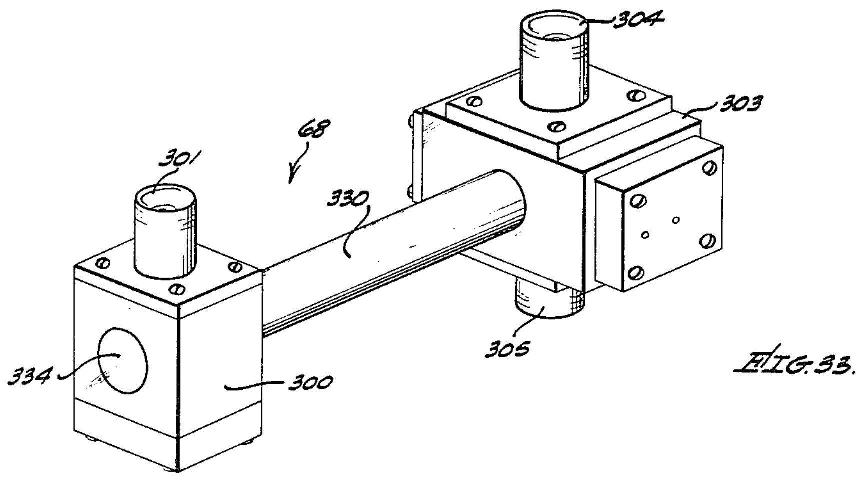

FIG. 33 is a perspective view of the phase shifter 68 with the field coil 306 removed for clarity. A length of tubing 330 of a nonmagnetic metal such as brass, for example, forms the outer wall of a differential phase shifter cylindrical waveguide to which is fastened at either end the input coupler 300 and the output coupler 303. The input connector 301 may be coupled to one of the output connectors 311 of the power splitter 70 by coaxial transmission line. The two output connectors 304 and 305 may be coupled by coaxial transmission lines to diametrically opposite antenna elements 60.

Figures 34, 35:
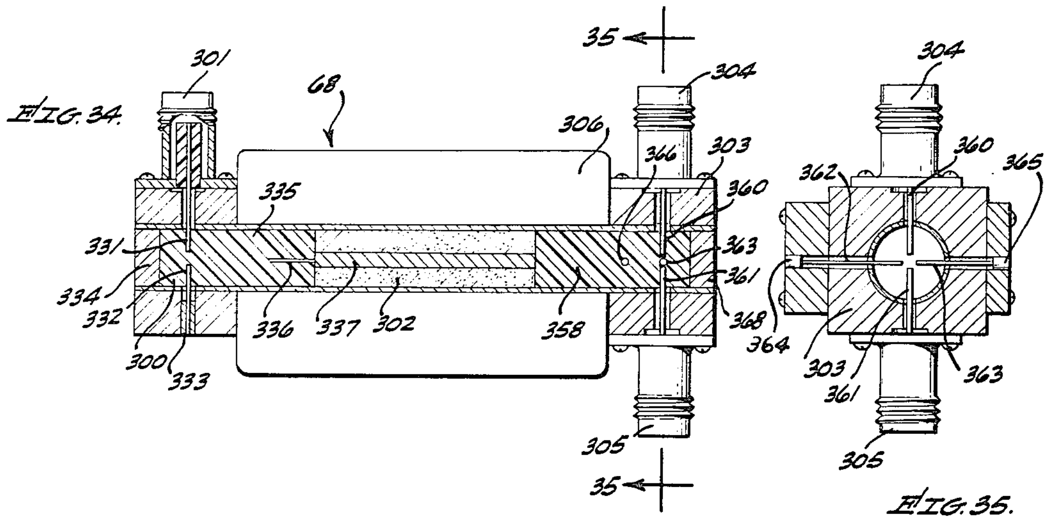

Referring now to FIG. 34, which is a longitudinal cross-section of the phase shifter 68, it will be seen that the input connector 301 has a probe 331 extending into the brass tubing 330 through a small hole provided therein. Diametrically opposite to the probe 331 from the input connector 301 is a second probe 332 which extends through a hole provided in the wall of the brass tube 330. Around the probe 332 is a movable short circuit member 333 which adjusts the length of the cavity from which the probe 332 protrudes into the input coupler 300. The end of the brass tubing 330 is closed by an adjustable cylindrical plug 334. A section of dielectric material 335 such as the material sold under the name Stycast by Emerson & Cumming is disposed inside the brass tube 330 within the input coupler 300 which permits the brass tube 330 to be of a shorter physical length than would otherwise be required due to the dielectric constant of the dielectric material 335, which constant is 4 in the present example. A triangular resistance card 336 is disposed within the dielectric material 335 in a plane transverse to a line through the probes 331 and 332. The ferrite tube 302 is disposed within the brass tube 330 adjacent the dielectric material 335. The center of the ferrite tube 302 may also be loaded with a dielectric material 337 for adjusting the cut off frequency of the circular waveguide and for providing an impedance match. At the opposite end of the ferrite tube 302 is placed another section of dielectric material 358 extending within the turnstile junction output coupler 303.

The output connectors 304, 305 are provided with probes 360 and 361 which extend into the brass tube 330 through small holes provided therein. These probes 360 and 361 are parallel to the probes 331 and 332 in the input coupler 300 in the present example although they need not be. Referring now to FIG. 35 which is a cross-section of the output coupler 303 taken in the direction indicated by the arrows 35—35, it will be seen that two additional probes 362 and 363 enter the brass tube 330 from diametrically opposite points along a line transverse to a line through the output connector probes 360 and 361. These four probes 360, 361, 362, 363 all lie in a single plane and their ends approach each other within the brass tube 330. The last-named probes 362 and 363 extend through the center of adjustable short-circuits 364 and 365 which can be moved to change the dimensions of the cavity from which the probes 362 and 363 protrude into the tube 330. It will be observed that the cavity associated with one of the probes 362 is longer than the other.

Figure 36:
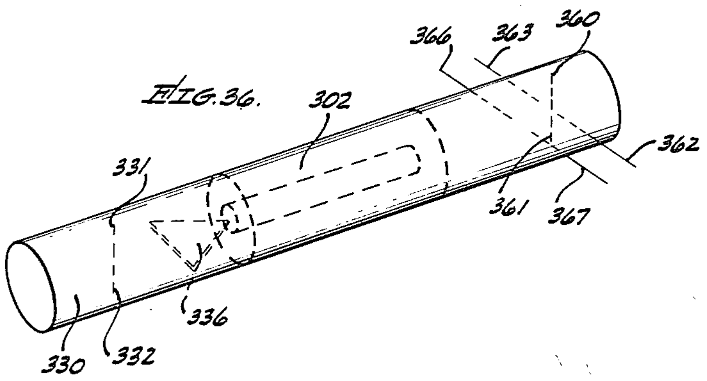

Referring now to FIG. 36, which is a diagrammatical representation of the phase shifter 68, and also referring to FIG. 34, two additional probes 366 and 367 are provided in the output coupler 303 parallel with the last two aforementioned probes 363 and 362 but displaced therefrom toward the ferrite tube 302. As may be seen in FIG. 34, the other end of the brass tube 330 is also closed by a movable cylindrical plug 368.

In operation, a radio frequency wave enters the phase shifter 68 through the input coaxial connector 301 where is propagates into the input coupler 300 along the input probe 331. The input probe 331, in conjunction with the opposing probe 332, propagates the incoming wave in the $TE_{11}$ mode down the brass tube 330. The dimensions of the brass tube 330 and the probes 331 and 332 and the positioning of the shortcircuit 333 minimize the possibility of propagating a wave in the TM mode which is the next closest mode which will propagate through circular waveguide. The plug 334 in the end of the brass tube 330 is adjusted to provide proper impedance match between the phase shifter 68 and the coaxial transmission line feeding the input connector 301. Due to the input probes 331 and 332 propagating the wave in the $TE_{11}$ mode, the electric field vector of the wave is parallel to a line through the probes 331, 332. Accordingly, as the wave propagates through the dielectric material 335, the electric field at the input end is perpendicular to the resistance card 336 and, accordingly, no power is dissipated therein.

As the radio frequency energy propagates through the ferrite tubing 302, the electric field vector receives a rotation which is a function of the angular position of the magnetic field in the ferrite tube 302 produced by the field coil 306. This effect is explained fully in the above-referenced articles in the technical journals. This electric RF field entering the output coupler 303 has an arbitrary polarization at an angle $\alpha$ with respect to a line transverse to a line through the output connector probes 360 and 361. The field may be resolved into a component parallel to the output connector probes 360 and 361, which will be referred to as the sin $\alpha$ component, and another component parallel to the transverse probes 362 and 363 which will be referred to as the cos $\alpha$ component. The sin $\alpha$ component propagates along the output connector probes 360 and 361 and out through the output connectors 304 and 305 with out-of-phase polarizations into coaxial transmission lines which connect to oppositely disposed antenna elements 60. That is, a $+\sin \alpha$ component leaves one of the connectors and a $-\sin \alpha$ component leaves the other. The cos $\alpha$ component propagates along the transverse probes 362 and 363 with out-of-phase polarization. That is, a $+\cos \alpha$ component propagates along one probe and a $-\cos \alpha$ component propagates along the other probe. The cos $\alpha$ components are reflected back into the waveguide by the short circuits 364 and 365 and arrive in-phase due to the longer path length to one of the short circuits 364. Hence, the $-\cos \alpha$ and $+\cos \alpha$ components return to the waveguide as two $+\cos \alpha$ components. The paths along the probes 362 and 363 are of such a length that the two $+\cos \alpha$ components now differ in phase from the corresponding sin $\alpha$ components by 90°. Accordingly, the $+\sin \alpha$ and $-\sin \alpha$ components will hereafter be designated as the $+j \sin \alpha$ and $-j \sin \alpha$ components. The two $+\cos \alpha$ components leave the coupler 303 along the output connector probes 360 and 361 with in-phase polarization, that is, a $+\cos \alpha$ component is present in each output connector 304 and 305. Hence, the resultant voltage in one of the output lines from the phase shifter 68 is $\cos \alpha + j \sin \alpha$ while the resultant voltage in the other output line is $\cos \alpha - j \sin \alpha$. $\cos \alpha + j \sin \alpha$ and $\cos \alpha - j \sin \alpha$ are mathematically equal to $e^{j\alpha}$ and $-e^{j\alpha}$, which indicates a constant amplitude and the required phase relationship at the output of the phase shifter 68.

Due to adjustment of the parameters associated with the transverse probes 362 and 363 to obtain the proper phase relationships, an impedance mismatch occurs. The two additional transverse probes 366 and 367 are adjusted to minimize this impedance mismatch.

Should any energy be reflected and propagate back through the ferrite tube 302 toward the input coupler 300, the component parallel to the resistance card 336 will be dissipated therein. The component parallel to the input probes 331 and 332 will return to the power splitter 70 where it is dissipated. Hence, the energy will not reflect back to the output coupler 303.

Hence, it will be seen that due to the transverse probes 362, 363, 366 and 367, practically all of the energy entering the input coupler 300 will be coupled out of the output coupler 303 through the output connectors 304 and 305. By proper adjustment of the variable shortcircuits 364 and 365 and the depth of the transverse probes 362, 363, 366, and 367 the energy entering the input connector 301 is translated into energy which leaves the output connectors 304 and 305 with the phase of one advanced and the phase of the other retarded by an amount equal to twice the amount of rotation of the magnetic field in the ferrite tube 302.

Because of the 22.5° phase displacement of the control voltages applied to the eight phase shifters 68, different antenna elements 60 at any given instant of time. Accordingly, each of the sixteen antenna elements 60 is provided with radio frequency energy in the proper phase to form a very narrow conical beam sufficient to illuminate the earth and, due to the constant variation of the control voltages applied to the phase shifters 68, the magnetic fields in the eight phase shifters continually rotate around the ferrite tube 302 at the rate of rotation of the satellite around its spin axis and, consequently, the antenna beam rotates with respect to the spin axis. Knowing the direction of spin of the satellite around the spin axis, the polarities of the control voltages are arranged to cause the beam to spin in the opposite direction so that the antenna beam apparently stays fixed in space as the satellite spins about its spin axis.

Thus, there has been described apparatus for rotating the field of a directional antenna array. This apparatus is seen to be useful either on fixed objects on the earth or on a space vehicle such as a satellite. The beam rotates at a constant velocity determined by input pulses from a pulse source which may be a solar sensor on a satellite. The direction of pointing of the beam is adjusted in increments around the rotation circle. The rotation velocity in the present example is on the order of two cycles per second but is widely variable for either lower or higher velocities by virtue of the use of digital circuits which produce sinusoidal control signals of high stability without the use of large inductors or capacitors. The initial direction of the beam is easily controlled by inserting additional pulses from an external source in a manner such as to either add to or subtract from the initial position of the beam at the time of the insertion of the pulses. Furthermore, a clock is provided for the insertion of solar correction pulses which correct the direction of the beam when the sun is used as a reference direction.

While only one embodiment of the invention has been shown and described, other modifications may be made and it is intended that the foregoing disclosure shall be considered only as illustrative of the principles of the invention and not construed in a limiting sense.

What is claimed is:

1. Apparatus for rotating a directive antenna field pattern comprising:
   (a) a pulse generator for developing successive trains of a predetermined number of repetitive vernier pulses each of which corresponds to a different angular pointing direction of a directive antenna field pattern;
   (b) a sine wave synthesizer electrically coupled to said pulse generator for converting said trains of vernier pulses into corresponding sine waves, the period of one of said sine waves corresponding to an interval during which said predetermined number of said vernier pulses is generated;
   (c) a phase control signal former coupled to said sine wave synthesizer for forming said sine waves into a plurality of periodic phase control signals having successive phase displacements from each other, the period of said phase control signals being equal to the period of said sine waves;
   (d) a plurality of controllable radio frequency phase shifters coupled to said phase control signal former;
   (e) a radio frequency energy generator coupled to said phase shifters to supply radio frequency energy thereto;
   (f) and a plurality of antenna elements coupled to said phase shifters for receiving radio frequency energy therefrom;
   (g) said phase shifters being responsive to said control signals to provide continuously phase shifted radio frequency energy to said antenna elements causing said antenna elements to form a continuously rotating directive antenna field pattern.

2. Apparatus for rotating a directive antenna field pattern comprising:
   (a) a pulse generator for developing successive trains of a predetermined number of repetitive vernier pulses each of which corresponds to a different angular pointing direction of a directive antenna field pattern;
   (b) a sine wave synthesizer electrically coupled to said pulse generator for converting said trains of vernier pulses into corresponding sine waves, the period of one of said sine waves corresponding to an interval during which said predetermined number of said vernier pulses is generated;
   (c) a phase control signal former coupled to said sine wave synthesizer for forming said sine waves into a plurality of periodic phase control signals having successive phase displacements from each other, the period of said phase control signals being equal to the period of said sine waves;
   (d) a plurality of controllable radio frequency phase shifters coupled to said phase control signal former, said phase shifters comprising a differential phase shift section of circular waveguide provided with a ferrite tube therein to produce different phase velocities for transverse radio frequency wave components propagated therethrough and having a four-pole, two-phase field coil for longitudinally magnetizing said ferrite;
   (e) a radio frequency energy generator coupled to said phase shifters to supply radio frequency energy thereto;
   (f) and a plurality of antenna elements coupled to said phase shifters for receiving radio frequency energy therefrom;
   (g) said phase shifters being responsive to said control signals for rotating the magnetizing field produced by said field coil to provide continuously phase shifted radio frequency energy to said antenna elements causing said antenna elements to form a continuously rotating directive antenna field pattern.

3. Apparatus for rotating a directive antenna field pattern comprising:
   (a) a pulse generator for developing successive trains of a predetermined number of repetitive vernier pulses each of which corresponds to a different angular pointing direction of a directive antenna field pattern;
   (b) a pulse source coupled to said pulse generator for providing pulses to synchronize the beginning of said trains of a predetermined number of repetitive vernier pulses;
   (c) a sine wave synthesizer electrically coupled to said pulse generator for converting said trains of vernier pulses into corresponding sine waves, the period of one of said sine waves corresponding to an interval during which said predetermined number of said vernier pulses is generated;
   (d) a phase control signal former coupled to said sine wave synthesizer for forming said sine waves into a plurality of pairs of periodic phase control signals in phase quadrature, said pairs of control signals having successive phase displacements from each other, the period of said phase control signals being equal to the period of said sine waves;
   (e) a plurality of controllable radio frequency phase shifters coupled to said phase control signal former, said phase shifters comprising a differential phase shift section of circular waveguide provided with a ferrite tube therein to produce different phase velocities for transverse radio frequency wave components propagated therethrough and having a four-pole, two-phase field coil for longitudinally magnetizing said ferrite;
   (f) a radio frequency energy generator coupled to said phase shifter to supply radio frequency energy thereto;
   (g) and a plurality of antenna elements coupled to said phase shifters for receiving radio frequency energy therefrom;
   (h) said phase shifters being responsive to said control signals for rotating the magnetizing field produced by said field coil to provide continuously phase shifted radio frequency energy to said antenna elements causing said antenna elements to form a continuously rotating directive antenna field pattern.

4. Apparatus for rotating a directive antenna field pattern comprising:
   (a) a pulse generator for developing successive trains of a predetermined number of repetitive vernier pulses each of which corresponds to a different angular pointing direction of a directive antenna field pattern;
   (b) a pulse source coupled to said pulse generator for providing a synchronizing pulse to synchronize the beginning of said trains of vernier pulses;
   (c) means coupled to said pulse generator for selectively adding or subtracting a vernier pulse from one of said trains;
   (d) a periodic wave synthesizer electrically coupled to said pulse generator for converting said trains of vernier pulses into corresponding periodic waves, the period of one of said periodic waves corresponding to an interval during which said predetermined number of said vernier pulses is generated;

(e) a phase control signal former coupled to said periodic wave synthesizer for forming said periodic waves into a plurality of pairs of periodic phase control signals in phase quadrature, said pairs of control signals having successive phase displacement from each other, the period of said phase control signals being equal to the period of said periodic waves;

(f) a plurality of controllable radio frequency phase shifters coupled to said phase control signal former, said phase shifters comprising a differential phase shift section of circular waveguide provided with a ferrite tube therein to produce different phase velocities for transverse radio frequency wave components propagated therethrough and having a four-pole, two-phase field coil for longitudinally magnetizing said ferrite;

(g) a radio frequency energy generator coupled to said phase shifters to supply radio frequency eneregy thereto;

(h) and a plurality of antenna elements coupled to said phase shifters for receiving the energy therefrom;

(i) said phase shifters being responsive to said control signals for rotating the magnetizing field produced by said field coil to provide continuously phase-shifted radio frequency energy to said antenna elements causing said antenna elements to form a continuously rotating directive antenna field pattern which may be adjusted in direction of pointing in increments corresponding to said predetermined number of repetitive vernier pulses by adding or subtracting a vernier pulse from one of said trains.

References Cited

UNITED STATES PATENTS 3,133,282 5/1964 Rosen ____________ 343—100.6

RODNEY D. BENNETT, Jr., Primary Examiner

H. C. WAMSLEY, Assistant Examiner